US011261889B2

(12) United States Patent
Liao

(10) Patent No.: US 11,261,889 B2
(45) Date of Patent: Mar. 1, 2022

(54) THERMAL MANAGEMENT FOR AIRCRAFT HYDRAULIC SYSTEMS

(71) Applicant: The Boeing Company, Chicago, IL (US)

(72) Inventor: Jianmin Liao, Chicago, IL (US)

(73) Assignee: The Boeing Company, Chicago, IL (US)

( * ) Notice: Subject to any disclaimer, the term of this patent is extended or adjusted under 35 U.S.C. 154(b) by 118 days.

(21) Appl. No.: 16/712,930

(22) Filed: Dec. 12, 2019

(65) Prior Publication Data

US 2021/0180622 A1    Jun. 17, 2021

(51) Int. Cl.
| | | |
|---|---|---|
| *F15B 21/04* | (2019.01) | |
| *F15B 21/042* | (2019.01) | |
| *F02C 7/224* | (2006.01) | |
| *F02C 7/14* | (2006.01) | |

(52) U.S. Cl.
CPC ............ *F15B 21/042* (2013.01); *F02C 7/224* (2013.01); *F02C 7/14* (2013.01); *F15B 2211/20576* (2013.01); *F15B 2211/62* (2013.01); *F15B 2211/7058* (2013.01)

(58) Field of Classification Search
CPC .. F15B 21/042; F15B 21/045; F15B 2211/66; F15B 2211/6343; F15B 11/17; F15B 2211/20576; F15B 2211/265; F15B 2211/3056; F15B 11/16; F15B 13/06
See application file for complete search history.

(56) References Cited

U.S. PATENT DOCUMENTS

| | | | |
|---|---|---|---|
| 3,699,847 A | 10/1972 | Little | |
| 4,505,124 A | 3/1985 | Mayer | |
| 4,705,100 A | 11/1987 | Black | |
| 4,776,536 A | 10/1988 | Hudson | |
| 7,520,465 B2 | 4/2009 | Mahjoub | |
| 8,484,962 B2 * | 7/2013 | Behr | B64C 13/40 60/456 |
| 9,644,648 B2 | 5/2017 | Liao | |
| 9,644,898 B2 | 5/2017 | Liao | |
| 9,920,779 B2 | 3/2018 | Liao | |
| 2012/0175080 A1 | 7/2012 | Muehthaler | |

* cited by examiner

*Primary Examiner* — Abiy Teka
*Assistant Examiner* — Daniel S Collins
(74) *Attorney, Agent, or Firm* — McDonnell Boehnen Hulbert & Berghoff LLP

(57) ABSTRACT

The present disclosure provides an aircraft thermal management system. The aircraft thermal management system includes a first hydraulic system for circulating a first hydraulic fluid, a second hydraulic system for circulating a second hydraulic fluid, and a third hydraulic system for circulating a third hydraulic fluid. The aircraft thermal management system also includes a controller configured to: (i) determine a temperature of the first hydraulic fluid, a temperature of the second hydraulic fluid, and a temperature of the third hydraulic fluid, and (ii) based on the determined temperature of the first hydraulic fluid, utilize the second hydraulic fluid and/or the third hydraulic fluid to modify an operational temperature of the first hydraulic fluid.

20 Claims, 16 Drawing Sheets

THERMAL MANAGEMENT FOR AIRCRAFT HYDRAULIC SYSTEMS

FIELD

The present disclosure relates generally to a thermal management system, and more particularly, to systems and methods for use in balancing and transporting heat among hydraulic systems within an aircraft.

BACKGROUND

Numerous systems are simultaneously tasked to efficiently and effectively support control of an aircraft during both ground and flight operations. For example, hydraulic systems manage hydraulic fluids configured to move flight controls, landing gear, and brakes. Electrical and fuel systems, among others, are designed to work harmoniously with the hydraulic systems to provide for continuous and reliable support of aircraft operations and functions. While there has been much progress in aircraft systems design, demands to produce greater economies and efficiencies within and among these various aircraft systems remain constant. In particular, a cost-effective and efficient system for heating and cooling of hydraulic fluid within an aircraft is desirable.

Existing solutions for hydraulic cooling includes positioning one or more heat exchangers inside of a fuel tank of the aircraft. Thus, the existing heat exchanger is designed and sized to enable fuel to be used as a cooling medium to reduce the operational temperature of the hydraulic fluid. However, this approach complicates manufacturing, installation, and maintenance of the heat exchanger. As a result, it is desirable to utilize a heat exchanger that is mounted externally from the fuel tank that is optimized to utilize a hydraulic fluid as a cooling medium to reduce the operational temperature of the hydraulic systems.

Accordingly, a system for cooling aircraft hydraulic fluid that would enable a hydraulic fluid heat exchanger to be positioned outside of an aircraft fuel tank would be considered to be beneficial. Moreover, if such a system were to offer increased aircraft operational efficiencies along with enhanced functionality, including the avoidance of dependence upon ram air, such an improved system may constitute a significant advance in aircraft systems design.

SUMMARY

In one aspect, an aircraft thermal management system is described. The aircraft thermal management system includes (a) a first hydraulic system for circulating a first hydraulic fluid, (b) a second hydraulic system for circulating a second hydraulic fluid, (c) a third hydraulic system for circulating a third hydraulic fluid, and (d) a controller configured to: (i) determine a temperature of the first hydraulic fluid, a temperature of the second hydraulic fluid, and a temperature of the third hydraulic fluid, and (ii) based on the determined temperature of the first hydraulic fluid, utilize the second hydraulic fluid and/or the third hydraulic fluid to modify an operational temperature of the first hydraulic fluid.

In another aspect, a method for managing temperatures in an aircraft is described. The method includes (a) circulating a first hydraulic fluid through a first hydraulic system, (b) circulating a second hydraulic fluid through a second hydraulic system, (c) circulating a third hydraulic fluid through a third hydraulic system, (d) determining a temperature of the first hydraulic fluid, a temperature of the second hydraulic fluid, and a temperature of the third hydraulic fluid, and (e) based on the determined temperature of the first hydraulic fluid, utilizing the second hydraulic fluid and/or the third hydraulic fluid to modify an operational temperature of the first hydraulic fluid.

In yet another aspect, a controller for an aircraft thermal management system is described. The controller includes (a) a processor, and (b) a non-transitory computer readable medium having stored therein instructions that are executable to cause the processor to perform functions, comprising: (i) circulating a first hydraulic fluid through a first hydraulic system, (ii) circulating a second hydraulic fluid through a second hydraulic system, (iii) circulating a third hydraulic fluid through a third hydraulic system, (iv) determining a temperature of the first hydraulic fluid, a temperature of the second hydraulic fluid, and a temperature of the third hydraulic fluid, and (v) based on the determined temperature of the first hydraulic fluid, utilizing the second hydraulic fluid and/or the third hydraulic fluid to modify an operational temperature of the first hydraulic fluid.

The features, functions, and advantages that have been discussed can be achieved independently in various examples or may be combined in yet other examples further details of which can be seen with reference to the following description and figures.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative examples of the present disclosure when read in conjunction with the accompanying figures.

DETAILED DESCRIPTION

Disclosed embodiments will now be described more fully hereinafter with reference to the accompanying figures, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Figure 16:
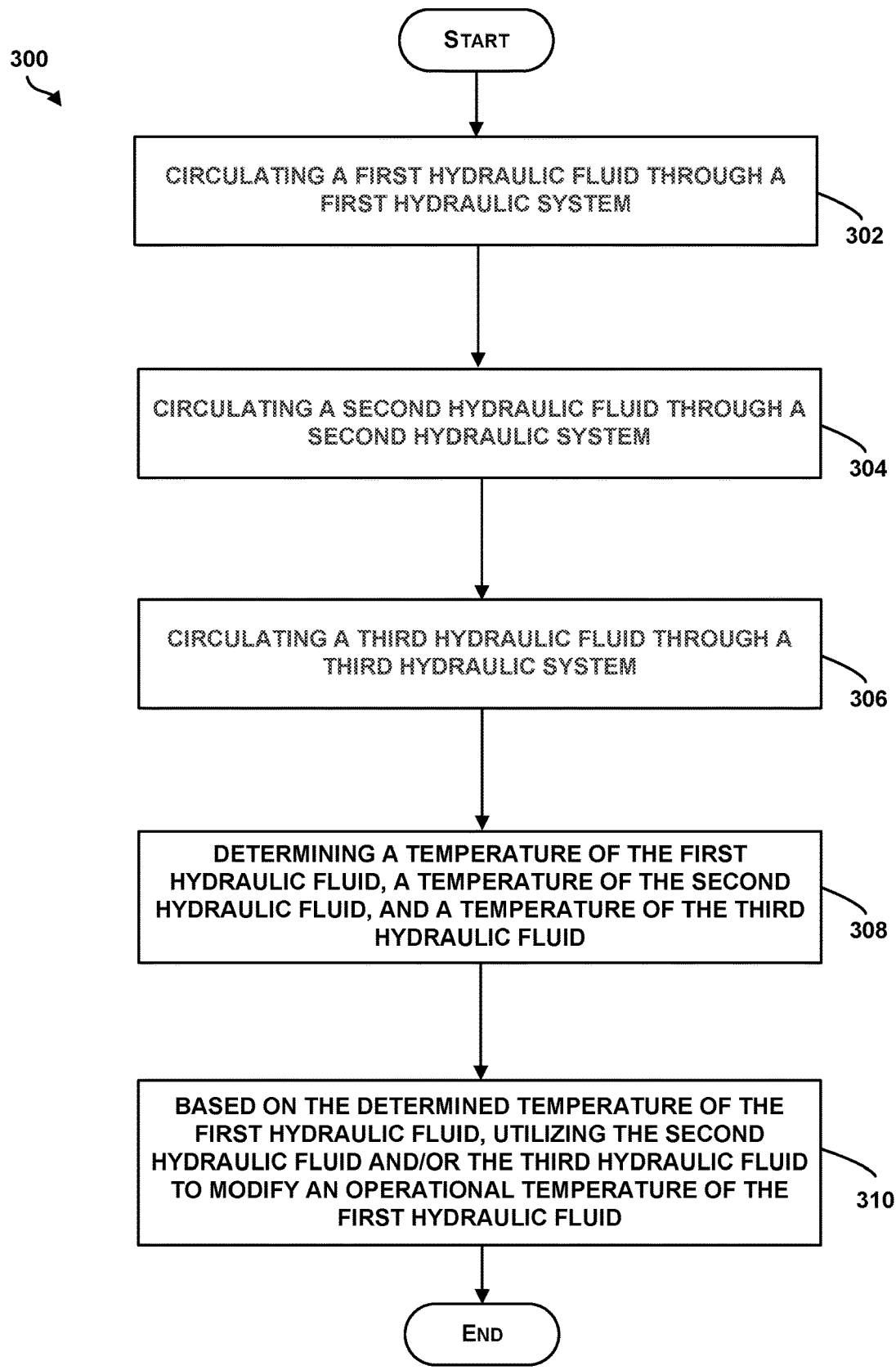
FIG. 16 is a flowchart of an example method, according to an example embodiment.

In FIG. 16, the blocks represent operations and/or portions thereof and lines connecting the various blocks do not imply any particular order or dependency of the operations or portions thereof. It will be understood that not all dependencies among the various disclosed operations are necessarily represented. FIG. 16 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one embodiment" or "one example" means that one or more feature, structure, or characteristic described in connection with the example is included in at least one implementation. The phrases "one embodiment" or "one example" in various places in the specification may or may not be referring to the same example.

As used herein, a system, apparatus, device, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

As used herein, with respect to measurements, "about" and "substantially" each means +/−5%.

Illustrative, non-exhaustive examples, which may or may not be claimed, of the subject matter according the present disclosure are provided below.

Figure 1:
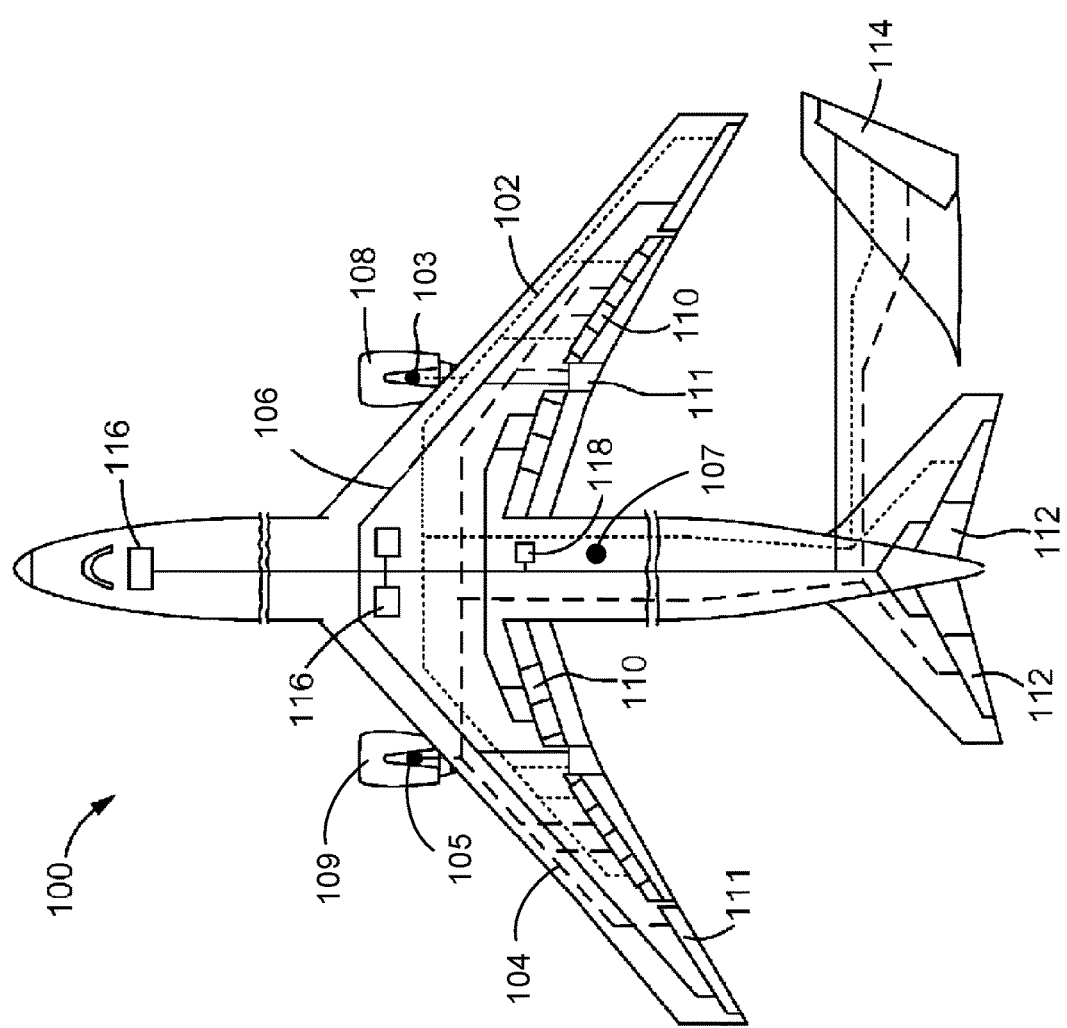
FIG. 1 is a diagram of an example aircraft that includes hydraulic systems and aircraft components that are powered by the hydraulic systems, according to an example embodiment.

With reference to the Figures, FIG. 1 is a diagram of an aircraft 100 that includes a first hydraulic system 102, a second hydraulic system 104, and a third hydraulic system 106. The first hydraulic system 102 may be pressurized by a first pump device 103 that is driven by a first engine 108 of the aircraft 100 and provides power for certain operating components of the aircraft 100. For example, the first hydraulic system 102 may power at least one spoiler 110, at least one aileron 111, at least one elevator 112, and/or at least one rudder 114 in the aircraft 100. Similarly, the second hydraulic system 104 may be pressurized by a second pump device 105 that is driven by a second engine 109 of the aircraft 100 and provides power for certain operating components of the aircraft 100. For example, the second hydraulic system 104 may power at least one spoiler 110, at least one aileron 111, at least one elevator 112, and/or at least one rudder 114 in the aircraft 100. Further, the third hydraulic system 106 may be pressurized by a third pump device 107. The third hydraulic system 106 may power components of aircraft 100 similar to the first hydraulic system 102 and the second hydraulic system 104 and, in addition, other components that are not powered by the first hydraulic system 102 or the second hydraulic system 104. For example, the third hydraulic system 106 may power landing gear 116 and/or brakes 118 of the aircraft 100. Additionally, in some implementations, the aircraft 100 is any other machine that includes at least three hydraulic systems.

Figure 2:
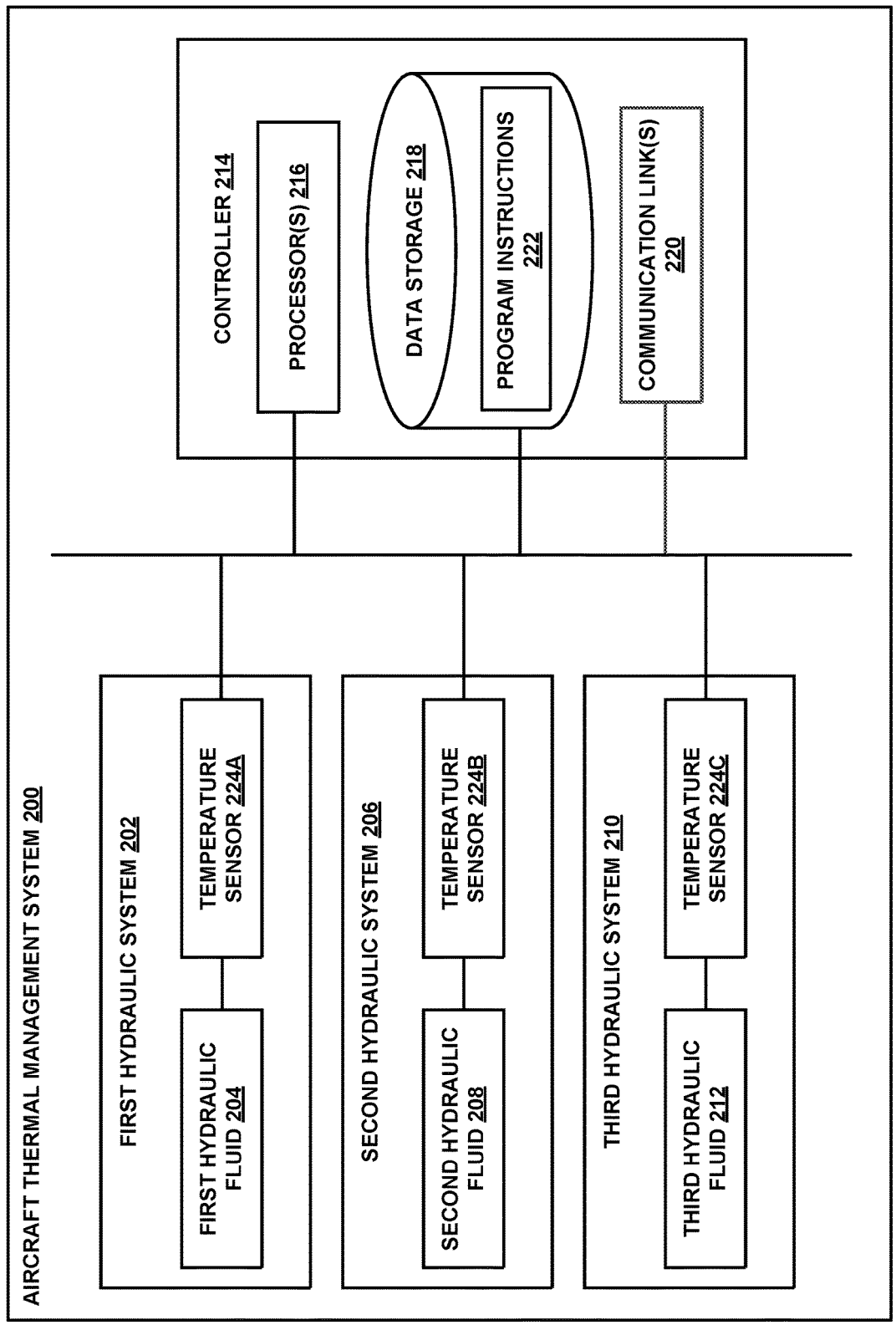
FIG. 2 is a simplified block diagram of an example aircraft thermal management system, according to an example embodiment.

FIG. 2 is a simplified block diagram of an example aircraft thermal management system 200 that can be used in the aircraft 100 described above. In particular, as illustrated in FIG. 2, the aircraft thermal management system 200 includes a first hydraulic system 202 for circulating a first hydraulic fluid 204, a second hydraulic system 206 for circulating a second hydraulic fluid 208, and a third hydraulic system 210 for circulating a third hydraulic fluid 212. The first hydraulic system 202, the second hydraulic system 206, and the third hydraulic system 210 of FIG. 2 may correspond to the first hydraulic system 102, the second hydraulic system 104, and the third hydraulic system 106 of FIG. 1. As shown in FIG. 2, the aircraft thermal management system 200 further incudes a first temperature sensor 224A positioned in or otherwise in communication the first hydraulic system 202 to measure a temperature of the first hydraulic fluid 204, a second temperature sensor 224B positioned in or otherwise in communication the second hydraulic system 206 to measure a temperature of the second hydraulic fluid 208, and a third temperature sensor 224C positioned in or otherwise in communication the third hydraulic system 210 to measure a temperature of the third hydraulic fluid 212. In one example, the operational temperatures of each of the first hydraulic fluid 204, the second hydraulic fluid 208, and the third hydraulic fluid 212 are different.

As further shown in FIG. 2, the aircraft thermal management system 200 further includes a controller 214. The controller 214 may include processor(s) 216, data storage 218, and communication link(s) 220. Processor(s) 216 may operate as one or more general-purpose hardware processors or special purpose hardware processors (e.g., digital signal processors, application specific integrated circuits, etc.). The processor(s) 216 may be configured to execute computer-readable program instructions 222 stored in the data storage 218. The processor(s) 216 or other components of the controller 214 may also directly or indirectly interact with other components of the aircraft thermal management system 200, such as temperature sensors 224A-224C and/or communication link(s) 220.

The data storage 218 may be one or more types of hardware memory. For example, the data storage 218 may include or take the form of one or more computer-readable storage media that can be read or accessed by processor(s) 216. The one or more computer-readable storage media can include volatile and/or non-volatile storage components, such as optical, magnetic, organic, or another type of memory or storage, which can be integrated in whole or in part with processor(s) 216. In some implementations, the data storage 218 can be a single physical device. In other implementations, the data storage 218 can be implemented using two or more physical devices, which may communicate with one another via wired or wireless communication. As noted previously, the data storage 218 may include the computer-readable program instructions 222, as well as additional data. The additional data may be any type of data, such as configuration data, sensor data, and/or diagnostic data, among other possibilities.

The controller 214 may include one or more electrical circuits, units of digital logic, computer chips, and/or microprocessors that are configured to (perhaps among other tasks), interface between any combination of the components in the aircraft thermal management system 200. In some implementations, the controller 214 may be a purpose-built embedded device for performing specific operations with one or more subsystems of the aircraft thermal management system 200.

The controller 214 monitors and physically changes the operating conditions of the aircraft thermal management system 200. In doing so, the controller 214 may serve as a link between portions of the aircraft thermal management system 200, such as between the temperature sensors 224A-224C and the control valves 236A-236F, as discussed in additional detail below. The example interfaces and communications noted above may be implemented via a wired or wireless connection, or both.

In some implementations, the controller 214 of the aircraft thermal management system 200 may also include communication link(s) 220 configured to send and/or receive information. In some cases, the communication link(s) 220 may include a wired connection. The communication link(s) 220 may include, in addition to or as an alternative to the wired connection, a wireless connection. Some example wireless connections may utilize a cellular connection, such as CDMA, EVDO, GSM/GPRS, or 4G telecommunication, such as WiMAX or LTE. Alternatively or in addition, the wireless connection may utilize a Wi-Fi connection to transmit data to a wireless local area network (WLAN). In some implementations, the wireless connection may also communicate over an infrared link, Bluetooth, or a near-field communication (NFC) device.

The communication link(s) 220 may transmit data indicating the state of the various components of the aircraft thermal management system 200. In some implementations, the aircraft thermal management system 200 may receive information at the communication link(s) 220 that is then processed by the processor(s) 216. The received information may indicate data that is accessible by the processor(s) 216 during execution of the computer-readable program instructions 222. For example, information read by temperature sensors 224A-224C may be transmitted via the communication link(s) 220 to the processor(s) 216 of the controller 214, and the controller 214 may then adjust one or more parameters of the aircraft thermal management system 200 based on the determined temperature readings.

In one example, during operation, the controller 214 may communicate with other components of the aircraft thermal management system 200 via wired or wireless connections, and may further be configured to communicate with one or more operators of the aircraft thermal management system 200. As one possible illustration, the controller 214 may receive an input (e.g., from a user) indicating an instruction to perform a particular set of one or more tasks (e.g., modify the operating temperature of one or more of the hydraulic systems). The input to the controller 214 may be received via the communication link(s) 220. Based on this input, the controller 214 may perform operations to cause the aircraft thermal management system 200 to perform one or more tasks to thereby modify the operating temperature of one or more of the hydraulic systems.

In one particular example, the controller 214 is configured to (i) determine a temperature of the first hydraulic fluid 204, a temperature of the second hydraulic fluid 208, and a temperature of the third hydraulic fluid 212, and (ii) based on the determined temperature of the first hydraulic fluid 204, utilize the second hydraulic fluid 208 and/or the third hydraulic fluid 212 to modify an operational temperature of the first hydraulic fluid 204. In one example, the temperature of the first hydraulic fluid 204 is measured by the first temperature sensor 224A and transmitted to the controller 214, the temperature of the second hydraulic fluid 208 is measured by the second temperature sensor 224B and transmitted to the controller 214, and the temperature of the third hydraulic fluid 212 is measured by the third temperature sensor 224C and transmitted to the controller 214.

In one example, the controller 214 is further configured to compare the determined temperature of the first hydraulic fluid 204 to a first threshold temperature and a second threshold temperature, where the second threshold temperature is greater than the first threshold temperature. In such an example, the controller 214 may be further configured to provide heat from the second hydraulic fluid 208 and the third hydraulic fluid 212 to the first hydraulic system 202 to thereby increase the operational temperature of the first hydraulic fluid 204 if the determined temperature of the first hydraulic fluid 204 is less than or equal to the first threshold temperature. In another example, the controller 214 may be further configured to provide heat from the second hydraulic fluid 208 or the third hydraulic fluid 212 to the first hydraulic system 202 to thereby increase the operational temperature of the first hydraulic fluid 204 if the determined temperature of the first hydraulic fluid 204 is between the first threshold temperature and the second threshold temperature. In yet another example, the controller 214 may be further configured to provide heat from the first hydraulic fluid 204 to the second hydraulic system 206 and/or the third hydraulic system 210 to thereby decrease the operational temperature of the first hydraulic fluid 204 if the determined temperature of the first hydraulic fluid 204 is greater than or equal to the second threshold temperature.

In another example, the controller 214 is configured to compare (i) the determined temperature of the first hydraulic fluid 204 to a threshold temperature, (ii) the determined temperature of the second hydraulic fluid 208 to the determined temperature of the first hydraulic fluid 204, (iii) the determined temperature of the third hydraulic fluid 212 to the determined temperature of the first hydraulic fluid 204, and (iv) the determined temperature of the second hydraulic fluid 208 to the determined temperature of the third hydraulic fluid 212. Based on each of those determinations, the controller 214 is then configured to utilize the second hydraulic fluid 208 and/or the third hydraulic fluid 212 to modify an operational temperature of the first hydraulic fluid 204.

Although the embodiments described above describe modifying the operational temperature of the first hydraulic fluid 204 of the first hydraulic system 202, similar methods may be used to modify the operation temperature of the second hydraulic fluid 208 and the third hydraulic fluid 212.

For example, the controller 214 may be configured to (i) determine a temperature of the first hydraulic fluid 204, a temperature of the second hydraulic fluid 208, and a temperature of the third hydraulic fluid 212 (using temperature sensors 224A-224C as discussed above), and (ii) based on the determined temperature of the second hydraulic fluid 208, utilize the first hydraulic fluid 204 and/or the third hydraulic fluid 212 to modify an operational temperature of the second hydraulic fluid 208. Similar to the embodiments described above, the controller 214 is further configured to compare the determined temperature of the second hydraulic fluid 208 to a first threshold temperature and a second threshold temperature, where the second threshold temperature is greater than the first threshold temperature. In such an example, the controller 214 may be further configured to provide heat from the first hydraulic fluid 204 and the third hydraulic fluid 212 to the second hydraulic system 206 to thereby increase the operational temperature of the second hydraulic fluid 208 if the determined temperature of the second hydraulic fluid 208 is less than or equal to the first threshold temperature.

In another example, the controller 214 may be further configured to provide heat from the first hydraulic fluid 204 or the third hydraulic fluid 212 to the second hydraulic system 206 to thereby increase the operational temperature of the second hydraulic fluid 208 if the determined temperature of the second hydraulic fluid 208 is between the first threshold temperature and the second threshold temperature. In yet another example, the controller 214 may be further configured to provide heat from the second hydraulic fluid 208 to the first hydraulic system 202 and/or the third hydraulic system 210 to thereby decrease the operational temperature of the second hydraulic fluid 208 if the determined temperature of the second hydraulic fluid 208 is greater than or equal to the second threshold temperature.

In another example, the controller 214 is configured to compare (i) the determined temperature of the second hydraulic fluid 208 to a threshold temperature, (ii) the determined temperature of the first hydraulic fluid 204 to the determined temperature of the second hydraulic fluid 208, (iii) the determined temperature of the third hydraulic fluid 212 to the determined temperature of the second hydraulic fluid 208, and (iv) the determined temperature of the first hydraulic fluid 204 to the determined temperature of the third hydraulic fluid 212. Based on each of those determinations, the controller 214 is then configured to utilize the first hydraulic fluid 204 and/or the third hydraulic fluid 212 to modify an operational temperature of the second hydraulic fluid 208.

Similarly, the controller 214 may be configured to (i) determine a temperature of the first hydraulic fluid 204, a temperature of the second hydraulic fluid 208, and a temperature of the third hydraulic fluid 212 (using temperature sensors 224A-224C as discussed above), and (ii) based on the determined temperature of the third hydraulic fluid 212, utilize the first hydraulic fluid 204 and/or the second hydraulic fluid 208 to modify an operational temperature of the third hydraulic fluid 212. Similar to the embodiments described above, the controller 214 is further configured to compare the determined temperature of the third hydraulic fluid 212 to a first threshold temperature and a second threshold temperature, where the second threshold temperature is greater than the first threshold temperature. In such an example, the controller 214 may be further configured to provide heat from the first hydraulic fluid 204 and the second hydraulic fluid 208 to the third hydraulic system 210 to thereby increase the operational temperature of the third hydraulic fluid 212 if the determined temperature of the third hydraulic fluid 212 is less than or equal to the first threshold temperature.

In another example, the controller 214 may be further configured to provide heat from the first hydraulic fluid 204 or the second hydraulic fluid 208 to the third hydraulic system 210 to thereby increase the operational temperature of the third hydraulic fluid 212 if the determined temperature of the third hydraulic fluid 212 is between the first threshold temperature and the second threshold temperature. In yet another example, the controller 214 may be further configured to provide heat from the third hydraulic fluid 212 to the first hydraulic system 202 and/or the second hydraulic system 206 to thereby decrease the operational temperature of the third hydraulic fluid 212 if the determined temperature of the third hydraulic fluid 212 is greater than or equal to the second threshold temperature.

In another example, the controller 214 is configured to compare (i) the determined temperature of the third hydraulic fluid 212 to a threshold temperature, (ii) the determined temperature of the first hydraulic fluid 204 to the determined temperature of the third hydraulic fluid 212, (iii) the determined temperature of the second hydraulic fluid 208 to the determined temperature of the third hydraulic fluid 212, and (iv) the determined temperature of the first hydraulic fluid 204 to the determined temperature of the second hydraulic fluid 208. Based on each of those determinations, the controller 214 is then configured to utilize the first hydraulic fluid 204 and/or the second hydraulic fluid 208 to modify an operational temperature of the third hydraulic fluid 212.

Although the embodiments described above describe modifying the operational temperature hydraulic fluids using the controller 214, the modifications may also be done manually by an operator. For example, the operator may receive an indication of the determined temperature of the first hydraulic fluid 204, the determined temperature of the second hydraulic fluid 208, and the determined temperature of the third hydraulic fluid 212 via temperature sensors 224A-224C. The operator may then determine which hydraulic system needs heating or cooling by comparing the determined temperature values to operational temperature ranges for the different hydraulic systems, and the operator may then open and close one or more of the control valves 236A-236F to cause the desired heat exchange to occur. Accordingly, one or more of the steps above may be performed by the operator instead of the controller 214.

Figure 3:
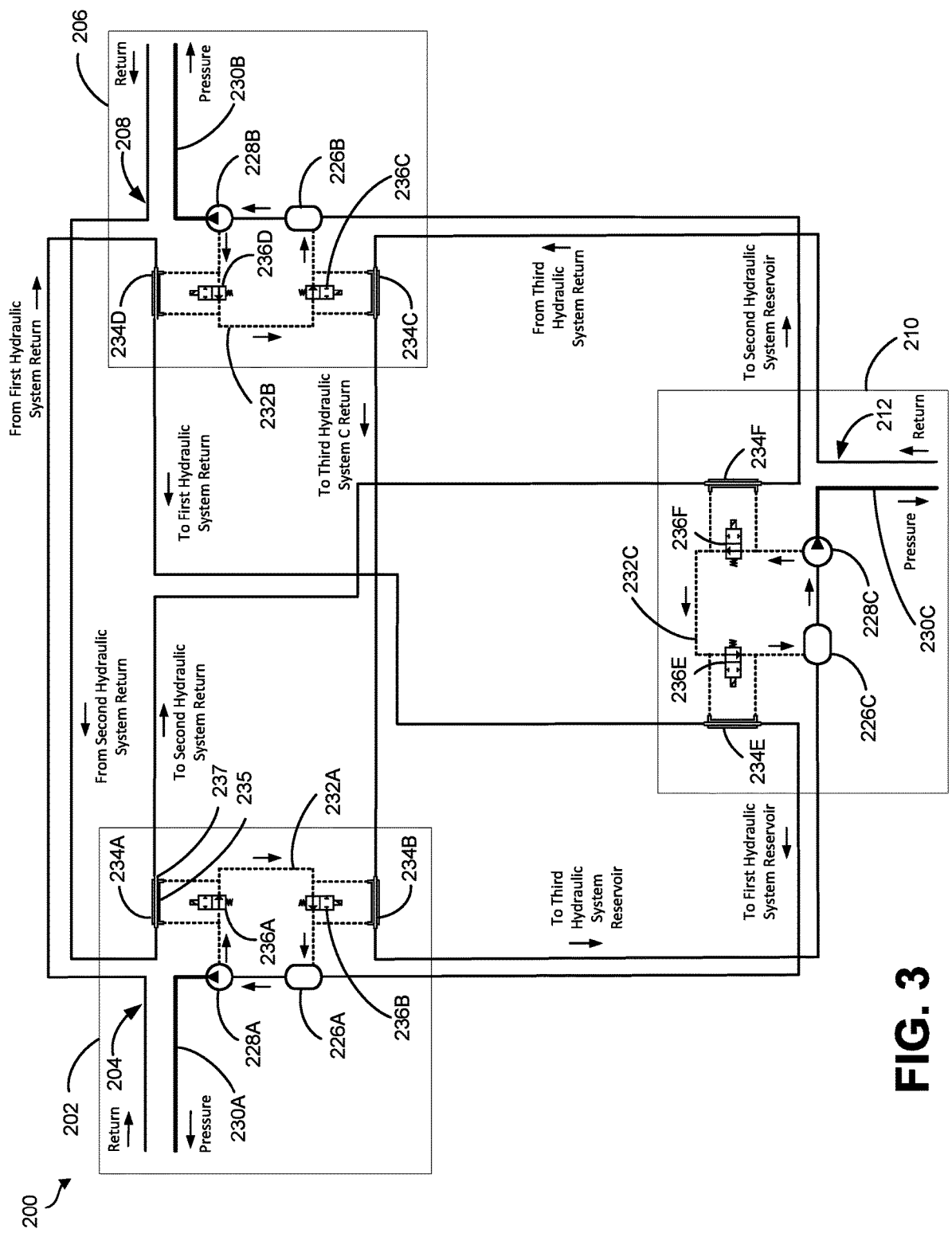
FIG. 3 is a detailed block diagram of an example aircraft thermal management system, according to an example embodiment.

FIG. 3 illustrates detailed block diagram of the aircraft thermal management system 200, according to an example embodiment. As shown in FIG. 3, the aircraft thermal management system 200 includes a first hydraulic system 202 for circulating a first hydraulic fluid 204, a second hydraulic system 206 for circulating a second hydraulic fluid 208, and a third hydraulic system 210 for circulating a third hydraulic fluid 212. The first hydraulic system 202, the second hydraulic system 206, and the third hydraulic system 210 of FIG. 3 may correspond to the first hydraulic system 202, the second hydraulic system 206, and the third hydraulic system 210 of FIG. 2, and/or the first hydraulic system 102, the second hydraulic system 104, and the third hydraulic system 106 of FIG. 1.

As shown in FIG. 3, in the first hydraulic system 202, the first hydraulic fluid 204 flows through a first reservoir 226A, and a first pump 228A located downstream of first reservoir 226A configured to pump the first hydraulic fluid 204 through a first pressure line 230A. A first case drain 232A is coupled to the first pump 228A and to the first reservoir 226A and routes any of first hydraulic fluid 204 that leaks out of the first pump 228A back to the first reservoir 226A. In one example, the first temperature sensor 224A is positioned within the first reservoir 226A, although other locations are possible as well.

Similarly, in the second hydraulic system 206, the second hydraulic fluid 208 flows through a second reservoir 226B, and a second pump 228B located downstream of second reservoir 226B configured to pump the second hydraulic fluid 208 through a second pressure line 230B. A second case drain 232B is coupled to the second pump 228B and to the second reservoir 226B and routes any of second hydraulic fluid 208 that leaks out of the second pump 228B back to the second reservoir 226B. In one example, the second temperature sensor 224B is positioned within the second reservoir 226B, although other locations are possible as well.

Similarly, in the third hydraulic system 210, the third hydraulic fluid 212 flows through a third reservoir 226C, and a third pump 228C located downstream of third reservoir 226C configured to pump the third hydraulic fluid 212 through a third pressure line 230C. A third case drain 232C is coupled to the third pump 228C and to the third reservoir 226C and routes any of third hydraulic fluid 212 that leaks out of the third pump 228C back to the third reservoir 226C. In one example, the third temperature sensor 224C is positioned within the third reservoir 226C, although other locations are possible as well.

As shown in FIG. 3, the first hydraulic system 202 may further include a first heat exchanger 234A in fluid communication with the first hydraulic system 202 via the first case drain 232A and the second hydraulic system 206 via the second hydraulic fluid 208, and a second heat exchanger 234B in fluid communication with the first hydraulic system 202 via the first case drain 232A and the third hydraulic system 210 via the third hydraulic fluid 212. The second hydraulic system 206 may include a third heat exchanger 234C in fluid communication with the second hydraulic system 206 via the second case drain 232B and the third hydraulic system 210 via the third hydraulic fluid 212, and a fourth heat exchanger 234D in fluid communication with the second hydraulic system 206 via the second case drain 232B and the first hydraulic system 202 via the first hydraulic fluid 204. The third hydraulic system 210 may include a fifth heat exchanger 234E in fluid communication with the third hydraulic system 210 via the third case drain 232C and the first hydraulic system 202 via the first hydraulic fluid 204, and a sixth heat exchanger 234F in fluid communication with the third hydraulic system 210 via the third case drain 232C and the second hydraulic system 206 via the second hydraulic fluid 208. Each of the heat exchangers 234A-234F may be located remote from the fuel tank of the aircraft.

The first heat exchanger 234A couples first hydraulic system 202 with the second hydraulic system 206 such that heat is exchanged between second hydraulic system 206 to first hydraulic system 202. As shown in FIG. 3, the first heat exchanger 234A comprises a tube-in-tube heat exchanger. In particular, the first heat exchanger 234A includes a first tube 235 and a second tube 237. The first tube 235 is coupled in fluid communication with the first hydraulic system 202 and the second tube 237 is coupled in fluid communication with the second hydraulic system 206. The first tube 235 surrounds or circumscribes the second tube 237, thereby enabling heat to be exchanged between first hydraulic system 202 and the second hydraulic system 206 without mixing first hydraulic fluid 204 with the second hydraulic fluid 208. Each of the heat exchangers 234A-234F may have a similar configuration to the first heat exchanger 234A as described above.

In particular, the first tube of the second heat exchanger 234B is in fluid communication with the first hydraulic system 202, and the second tube of the second heat exchanger 234B is in fluid communication with the third hydraulic system 210. Further, the first tube of the third heat exchanger 234C is in fluid communication with the second hydraulic system 206, and the second tube of the third heat exchanger 234C is in fluid communication with the third hydraulic system 210. Further, the first tube of the fourth heat exchanger 234D is in fluid communication with the second hydraulic system 206, and the second tube of the fourth heat exchanger 234D is in fluid communication with the first hydraulic system 202. Further, the first tube of the fifth heat exchanger 234E is in fluid communication with the third hydraulic system 210, and the second tube of the fifth heat exchanger 234E is in fluid communication with the first hydraulic system 202. Further still, the first tube of the sixth heat exchanger 234F is in fluid communication with the third hydraulic system 210, and the second tube of the sixth heat exchanger 234F is in fluid communication with the second hydraulic system 206.

As shown in FIG. 3, the first hydraulic system 202 may further include a first control valve 236A in fluid communication with the first hydraulic system 202 via the first case drain 232A and the first heat exchanger 234A. The first heat exchanger 234A is configured to exchange heat between the first hydraulic fluid 204 and the second hydraulic fluid 208 when the first control valve 236A is actuated. The first hydraulic system 202 may further include a second control valve 236B coupled in fluid communication with the first hydraulic system 202 via the first case drain 232A and the second heat exchanger 234B. The second heat exchanger 234B is configured to exchange heat between the first hydraulic fluid 204 and the third hydraulic fluid 212 when the second control valve 236B is actuated.

Similarly, the second hydraulic system 206 may further include a third control valve 236C in fluid communication with the second hydraulic system 206 via the second case drain 232B and the third heat exchanger 234C. The third heat exchanger 234C is configured to exchange heat between the second hydraulic fluid 208 and the third hydraulic fluid 212 when the third control valve 236C is actuated. The second hydraulic system 206 may further include a fourth control valve 236D in fluid communication with the second hydraulic system 206 via the second case drain 232B and the fourth heat exchanger 234D. The fourth heat exchanger 234D is configured to exchange heat between the second hydraulic fluid 208 and the first hydraulic fluid 204 when the fourth control valve 236D is actuated.

Similarly, the third hydraulic system 210 may further include a fifth control valve 236E in fluid communication with the third hydraulic system 210 via the third case drain 232C and the fifth heat exchanger 234E. The fifth heat exchanger 234E is configured to exchange heat between the third hydraulic fluid 212 and the first hydraulic fluid 204 when the fifth control valve 236E is actuated. The third hydraulic system 210 may further include a sixth control valve 236F in fluid communication with the third hydraulic system 210 via the third case drain 232C and the sixth heat exchanger 234F. The sixth heat exchanger 234F is configured to exchange heat between the third hydraulic fluid 212 and the second hydraulic fluid 208 when the sixth control valve 236F is actuated. In one example, each of the control valves 236A-236F comprises a solenoid valve.

In one embodiment, the first control valve 236A is configured to transition from an open position to a closed position, and the first heat exchanger 234A is configured to exchange heat between the first hydraulic fluid 204 and the second hydraulic fluid 208 when the first control valve 236A is in the open position. Similarly, the second control valve 236B may be configured to transition from an open position to a closed position, and the second heat exchanger 234B may be configured to exchange heat between the first hydraulic fluid 204 and the third hydraulic fluid 212 when the second control valve 236B is in the open position. Similarly, the third control valve 236C may be configured to transition from an open position to a closed position, and the third heat exchanger 234C may be configured to exchange heat between the second hydraulic fluid 208 and the third hydraulic fluid 212 when the third control valve 236C is in the open position. Similarly, the fourth control valve 236D may be configured to transition from an open position to a closed position, and the fourth heat exchanger 234D may be configured to exchange heat between the second hydraulic fluid 208 and the first hydraulic fluid 204 when the fourth control valve 236D is in the open position. Similarly, the fifth control valve 236E may be configured to transition from an open position to a closed position, and the fifth heat exchanger 234E may be configured to exchange heat between the third hydraulic fluid 212 and the first hydraulic fluid 204 when the fifth control valve 236E is in the open position. Similarly, the sixth control valve 236F may be configured to transition from an open position to a closed position, and the sixth heat exchanger 234F may be configured to exchange heat between the third hydraulic fluid 212 and the second hydraulic fluid 208 when the sixth control valve 236F is in the open position.

With reference to the Figures, FIG. 3 illustrates the aircraft thermal management system 200 in a neutral state, in which no heat transfer occurs between the first hydraulic system 202, the second hydraulic system 206, and the third hydraulic system 210. In operation, the controller 214 includes information in the data storage 218 indicative of operational temperatures for each of the first hydraulic fluid 204, the second hydraulic fluid 208, and the third hydraulic fluid 212. For example, the controller 214 includes a preferred temperature range for the first hydraulic fluid 204, the second hydraulic fluid 208, and the third hydraulic fluid 212. During operation, the controller 214 periodically receives the temperature of the first hydraulic fluid 204 from the first temperature sensor 224A, the temperature of the second hydraulic fluid 208 from the second temperature sensor 224B, and the temperature of the third hydraulic fluid 212 from the third temperature sensor 224C. If the controller 214 determines that the temperature of the first hydraulic fluid 204, the temperature of the second hydraulic fluid 208, and the temperature of the third hydraulic fluid 212 are each within their preferred temperature ranges, the controller 214 causes each of the control valves 236A-236F to be in an unactuated state as shown in FIG. 3. When each of the control valves 236A-236F are in an unactuated state, no heat transfer occurs between the first hydraulic system 202, the second hydraulic system 206, and the third hydraulic system 210 and the hydraulic systems are thermally balanced.

Figure 4:
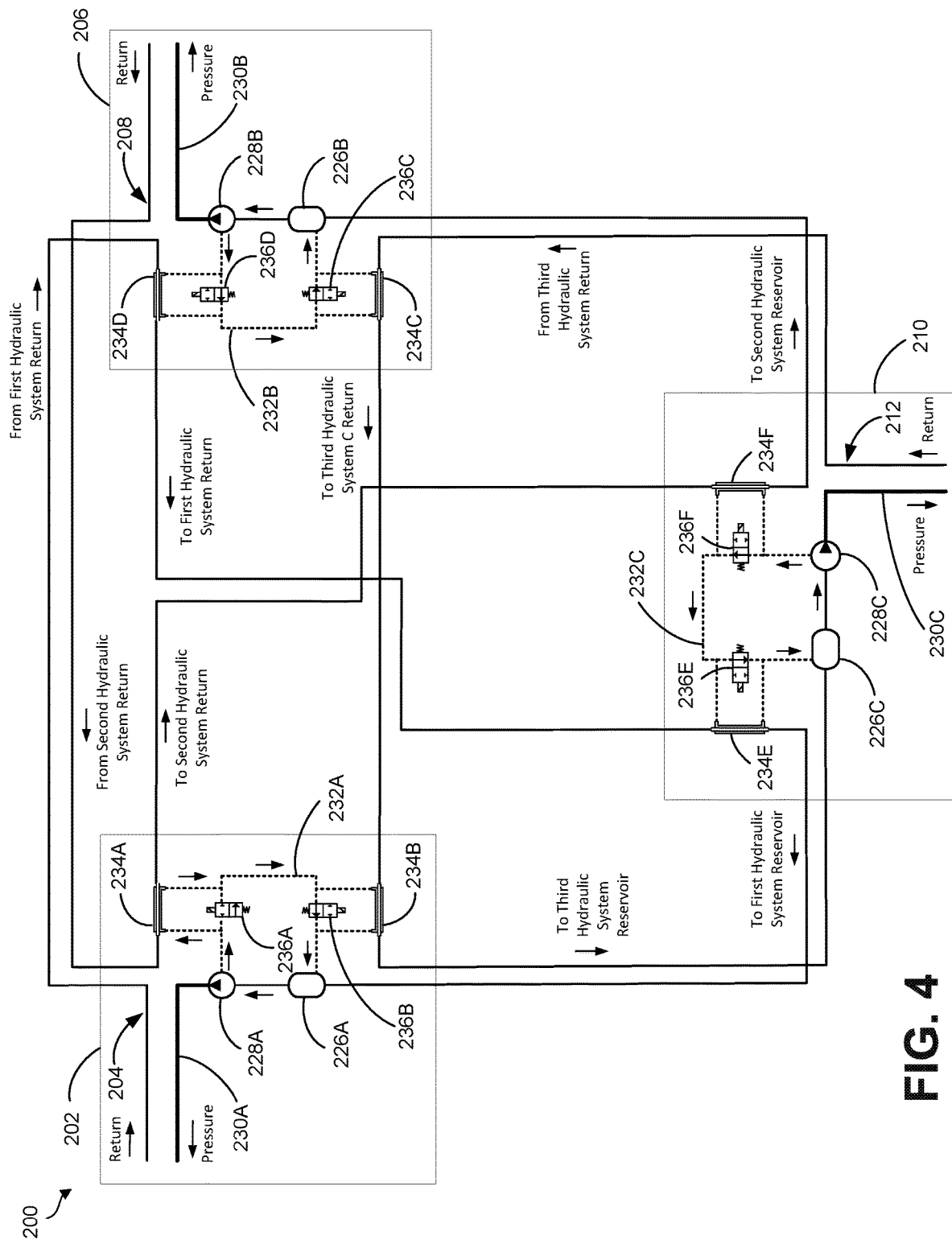
FIG. 4 is another configuration of the block diagram of the example aircraft thermal management system of FIG. 3, according to an example embodiment.

FIG. 4 illustrates the aircraft thermal management system 200 in which the first control valve 236A is actuated, such that the first heat exchanger 234A is configured to exchange heat between the first hydraulic fluid 204 and the second hydraulic fluid 208. Such an arrangement may occur when the controller 214 determines that the temperature of the first hydraulic fluid 204 is greater than a threshold, and the controller 214 further determines that the temperature of the second hydraulic fluid 208 is less than the temperature of the first hydraulic fluid 204. Accordingly, such a configuration may be utilized to warmup the second hydraulic fluid 208 and/or cool down the first hydraulic fluid 204.

Figure 5:
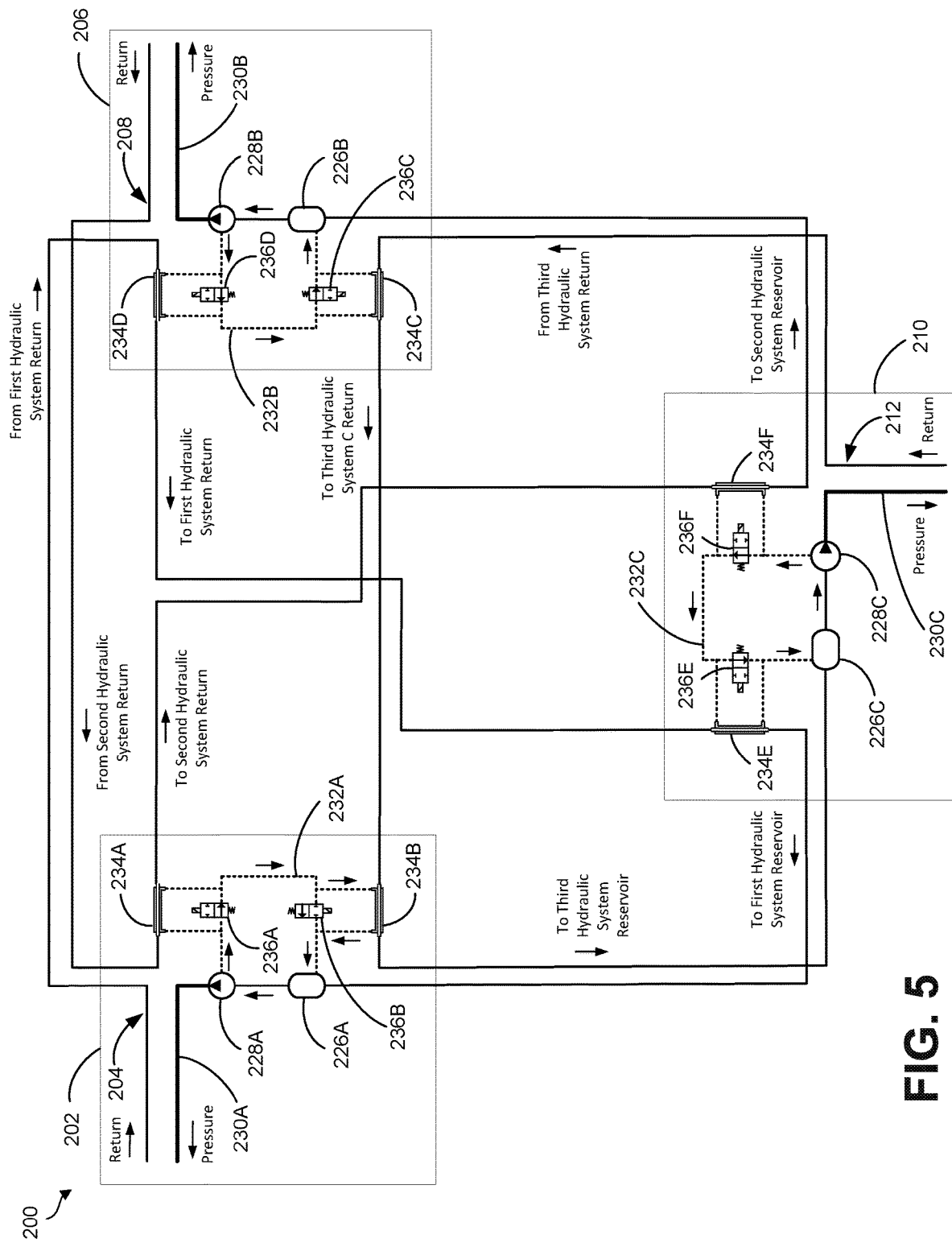
FIG. 5 is another configuration of the block diagram of the example aircraft thermal management system of FIG. 3, according to an example embodiment.

FIG. 5 illustrates the aircraft thermal management system 200 in which the second control valve 236B is actuated, such that the second heat exchanger 234B is configured to exchange heat between the first hydraulic fluid 204 and the third hydraulic fluid 212. Such an arrangement may occur when the controller 214 determines that the temperature of the first hydraulic fluid 204 is greater than a threshold, and the controller 214 further determines that the temperature of the third hydraulic fluid 212 is less than the temperature of the first hydraulic fluid 204. Accordingly, such a configuration may be utilized to warmup the third hydraulic fluid 212 and/or cool down the first hydraulic fluid 204.

Figure 6:
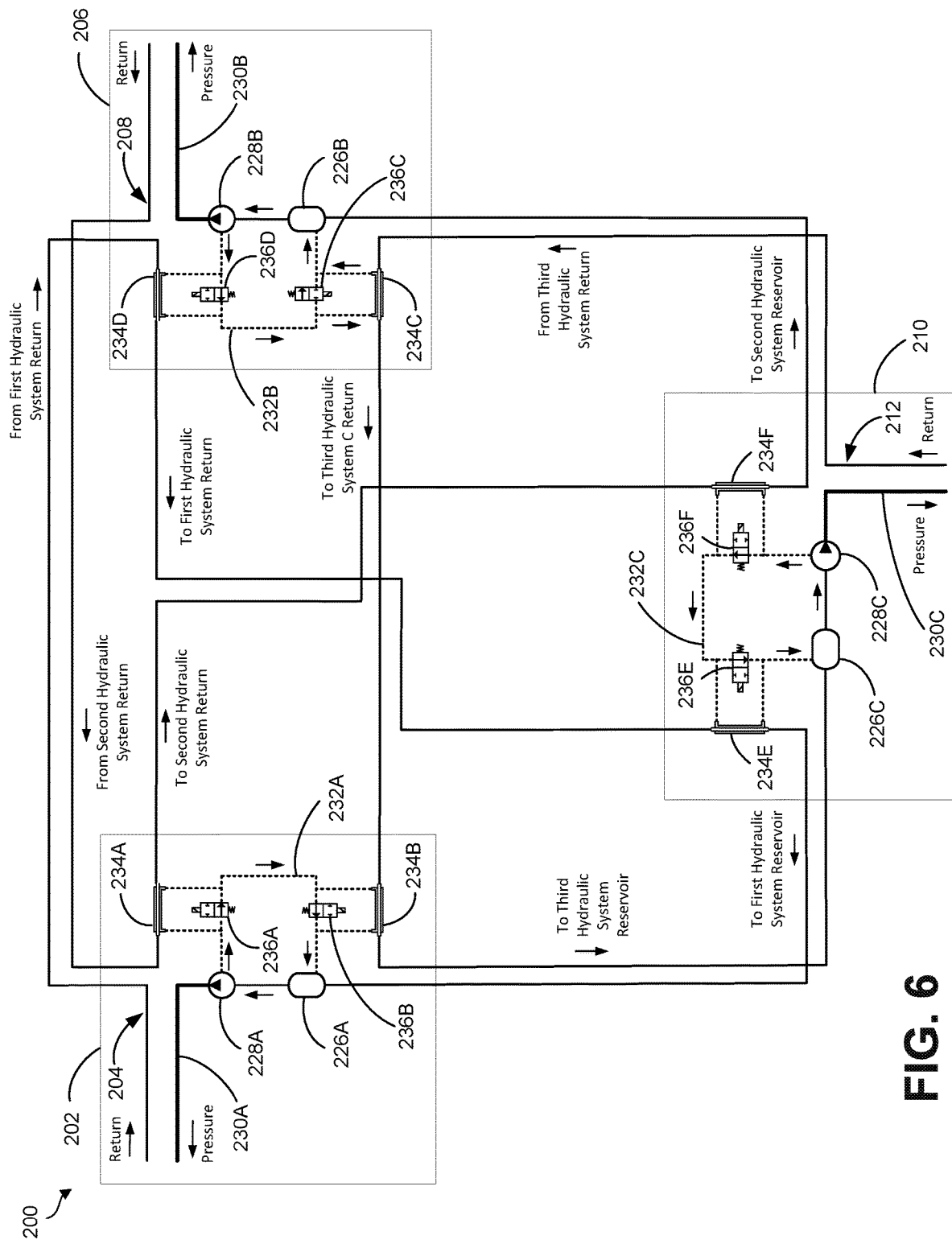
FIG. 6 is another configuration of the block diagram of the example aircraft thermal management system of FIG. 3, according to an example embodiment.

FIG. 6 illustrates the aircraft thermal management system 200 in which the third control valve 236C is actuated, such that the third heat exchanger 234C is configured to exchange heat between the second hydraulic fluid 208 and the third hydraulic fluid 212. Such an arrangement may occur when the controller 214 determines that the temperature of the second hydraulic fluid 208 is greater than a threshold temperature, and the controller 214 further determines that the temperature of the third hydraulic fluid 212 is less than the temperature of the second hydraulic fluid 208. Accordingly, such a configuration may be utilized to warmup the third hydraulic fluid 212 and/or cool down the second hydraulic fluid 208.

Figure 7:
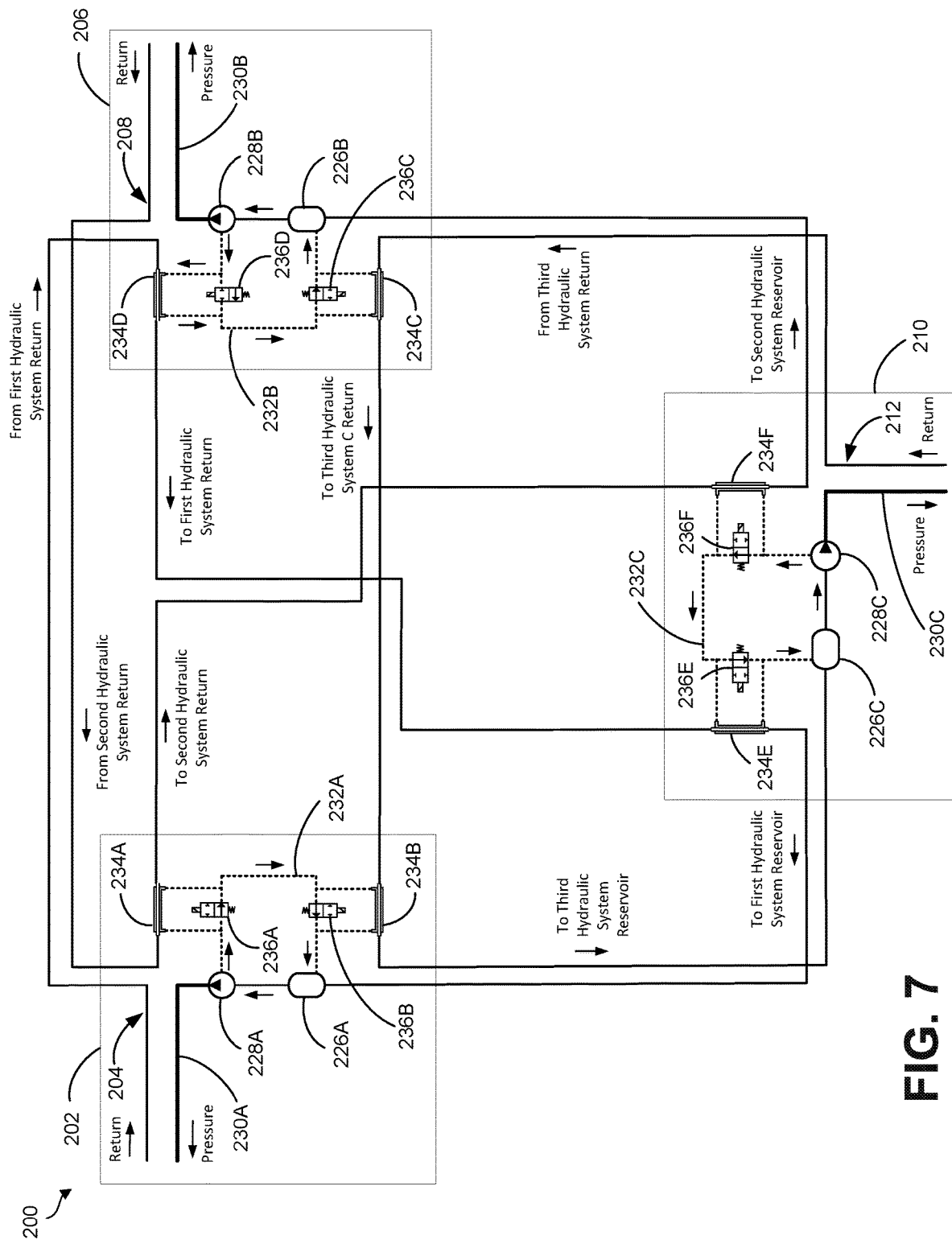
FIG. 7 is another configuration of the block diagram of the example aircraft thermal management system of FIG. 3, according to an example embodiment.

FIG. 7 illustrates the aircraft thermal management system 200 in which the fourth control valve 236D is actuated, such that the fourth heat exchanger 234D is configured to exchange heat between the second hydraulic fluid 208 and the first hydraulic fluid 204. Such an arrangement may occur when the controller 214 determines that the temperature of the second hydraulic fluid 208 is greater than a threshold temperature, and the controller 214 further determines that the temperature of the first hydraulic fluid 204 is less than the temperature of the second hydraulic fluid 208. Accordingly, such a configuration may be utilized to warmup the first hydraulic fluid 204 and/or cool down the second hydraulic fluid 208.

Figure 8:
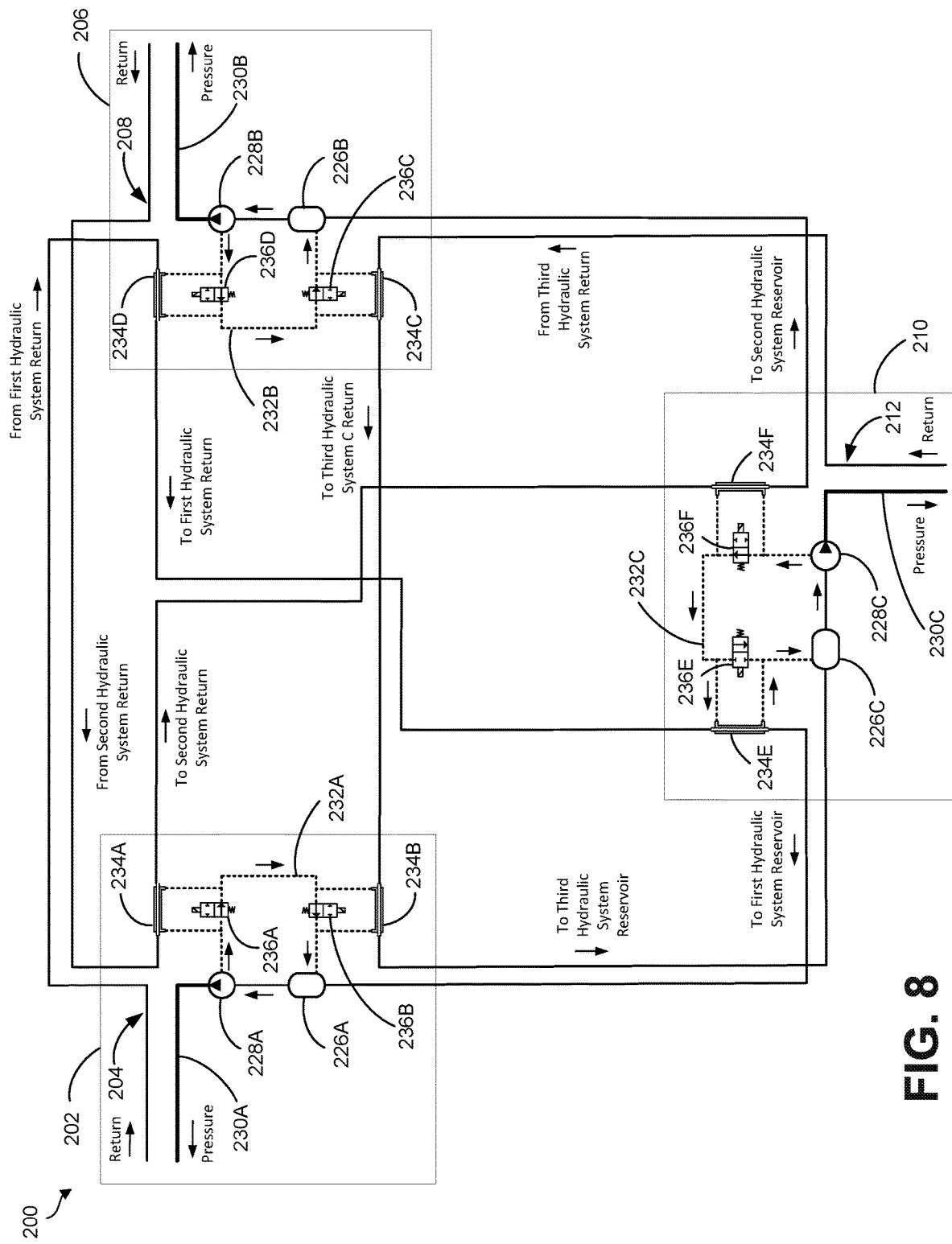
FIG. 8 is another configuration of the block diagram of the example aircraft thermal management system of FIG. 3, according to an example embodiment.

FIG. 8 illustrates the aircraft thermal management system 200 in which the fifth control valve 236E is actuated, such that the fifth heat exchanger 234E is configured to exchange heat between the third hydraulic fluid 212 and the first hydraulic fluid 204. Such an arrangement may occur when the controller 214 determines that the temperature of the third hydraulic fluid 212 is greater than a threshold temperature, and the controller 214 further determines that the temperature of the first hydraulic fluid 204 is less than the temperature of the third hydraulic fluid 212. Accordingly, such a configuration may be utilized to warmup the first hydraulic fluid 204 and/or cool down the third hydraulic fluid 212.

Figure 9:
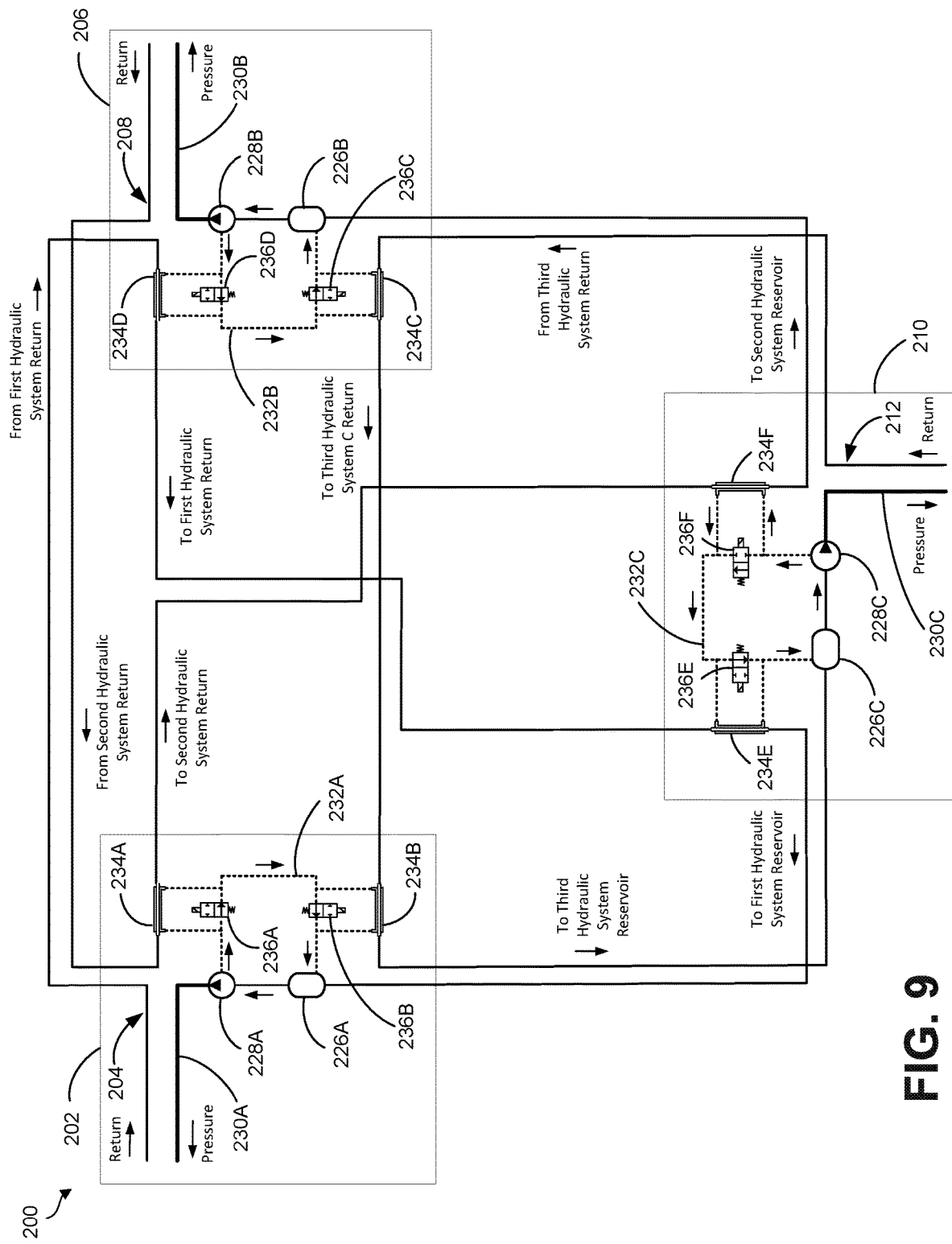
FIG. 9 is another configuration of the block diagram of the example aircraft thermal management system of FIG. 3, according to an example embodiment.

FIG. 9 illustrates the aircraft thermal management system 200 in which the sixth control valve 236F is actuated, such that the sixth heat exchanger 234F is configured to exchange heat between the third hydraulic fluid 212 and the second hydraulic fluid 208. Such an arrangement may occur when the controller 214 determines that the temperature of the third hydraulic fluid 212 is greater than a threshold temperature, and the controller 214 further determines that the temperature of the second hydraulic fluid 208 is less than the temperature of the third hydraulic fluid 212. Accordingly, such a configuration may be utilized to warmup the second hydraulic fluid 208 and/or cool down the third hydraulic fluid 212.

Figure 10:
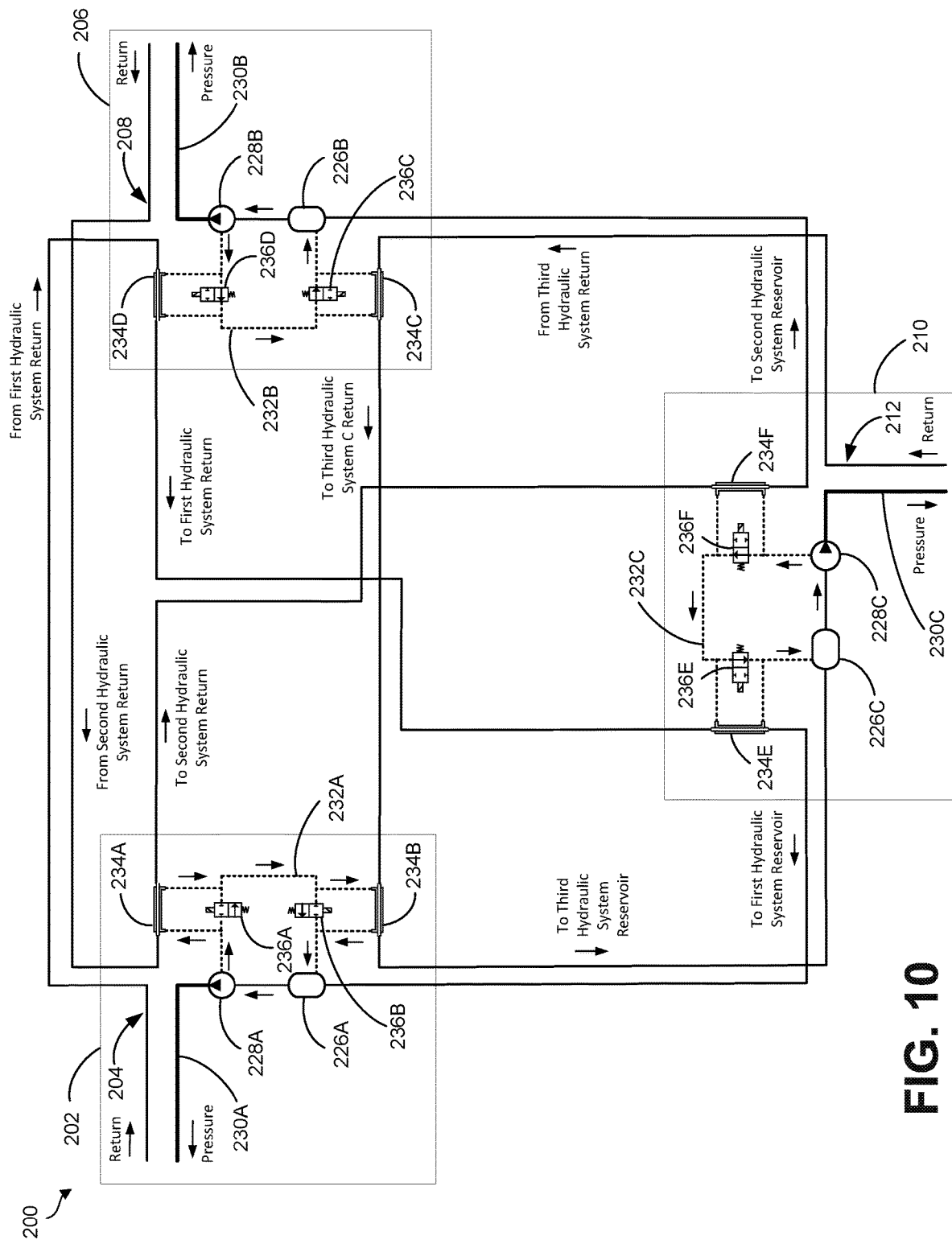
FIG. 10 is another configuration of the block diagram of the example aircraft thermal management system of FIG. 3, according to an example embodiment.

FIG. 10 illustrates the aircraft thermal management system 200 in which the first control valve 236A and the second control valve 236B are actuated, such that the first heat exchanger 234A is configured to exchange heat between the first hydraulic fluid 204 and the second hydraulic fluid 208 and the second heat exchanger 234B is configured to exchange heat between the first hydraulic fluid 204 and the third hydraulic fluid 212. Such an arrangement may occur when the controller 214 determines that the temperature of the first hydraulic fluid 204 is greater than a threshold temperature, and the controller 214 further determines that the temperature of the second hydraulic fluid 208 and the temperature of the third hydraulic fluid 212 are both less than the temperature of the first hydraulic fluid 204. Accordingly, such a configuration may be utilized to quickly cool down the first hydraulic fluid 204 to avoid overheating.

Figure 11:
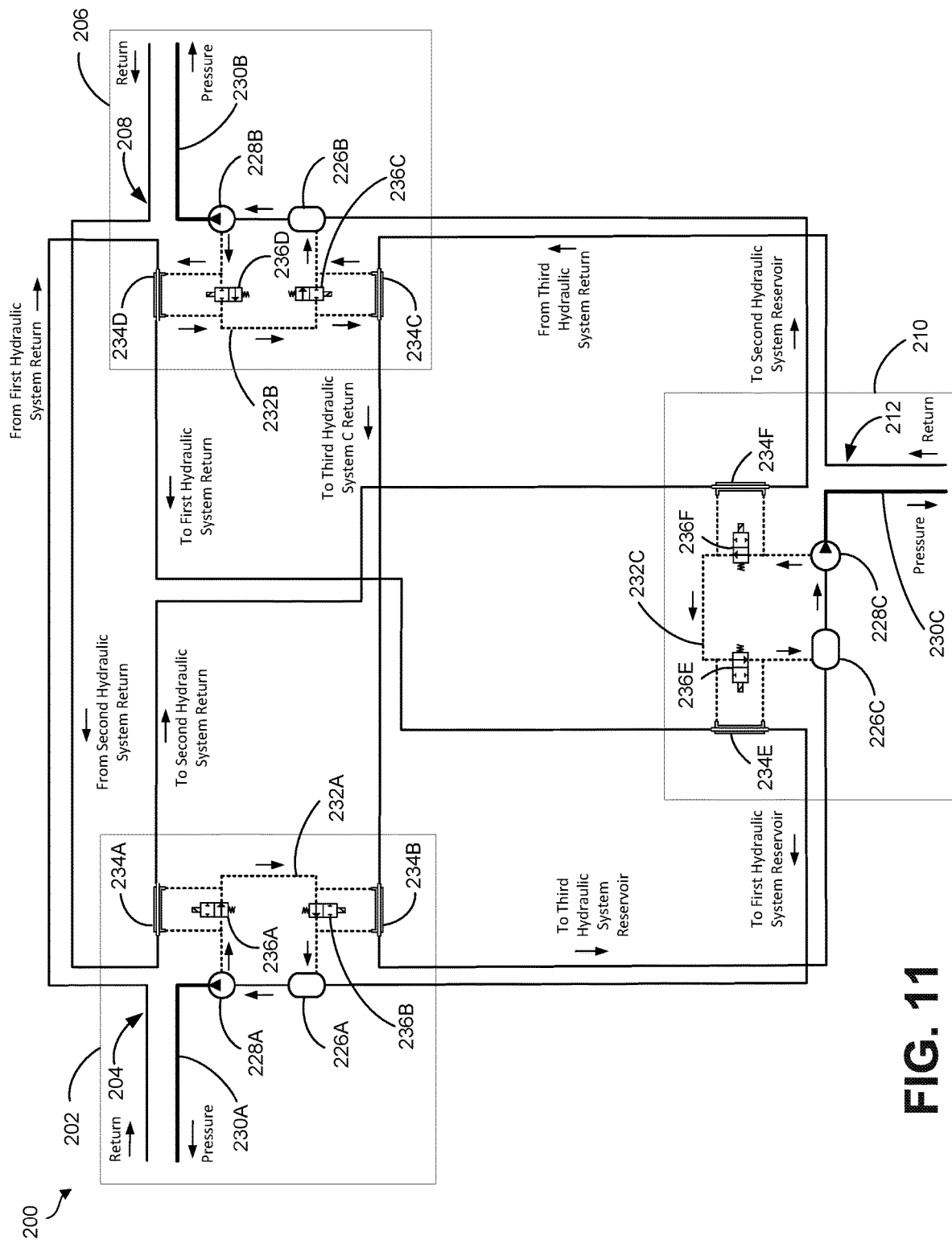
FIG. 11 is another configuration of the block diagram of the example aircraft thermal management system of FIG. 3, according to an example embodiment.

FIG. 11 illustrates the aircraft thermal management system 200 in which the third control valve 236C and the fourth control valve 236D are actuated, such that the third heat exchanger 234C is configured to exchange heat between the second hydraulic fluid 208 and the third hydraulic fluid 212 and the fourth heat exchanger 234D is configured to exchange heat between the second hydraulic fluid 208 and the first hydraulic fluid 204. Such an arrangement may occur when the controller 214 determines that the temperature of the second hydraulic fluid 208 is greater than a threshold temperature, and the controller 214 further determines that the temperature of the first hydraulic fluid 204 and the temperature of the third hydraulic fluid 212 are both less than the temperature of the second hydraulic fluid 208. Accordingly, such a configuration may be utilized to quickly cool down the second hydraulic fluid 208 to avoid overheating.

Figure 12:
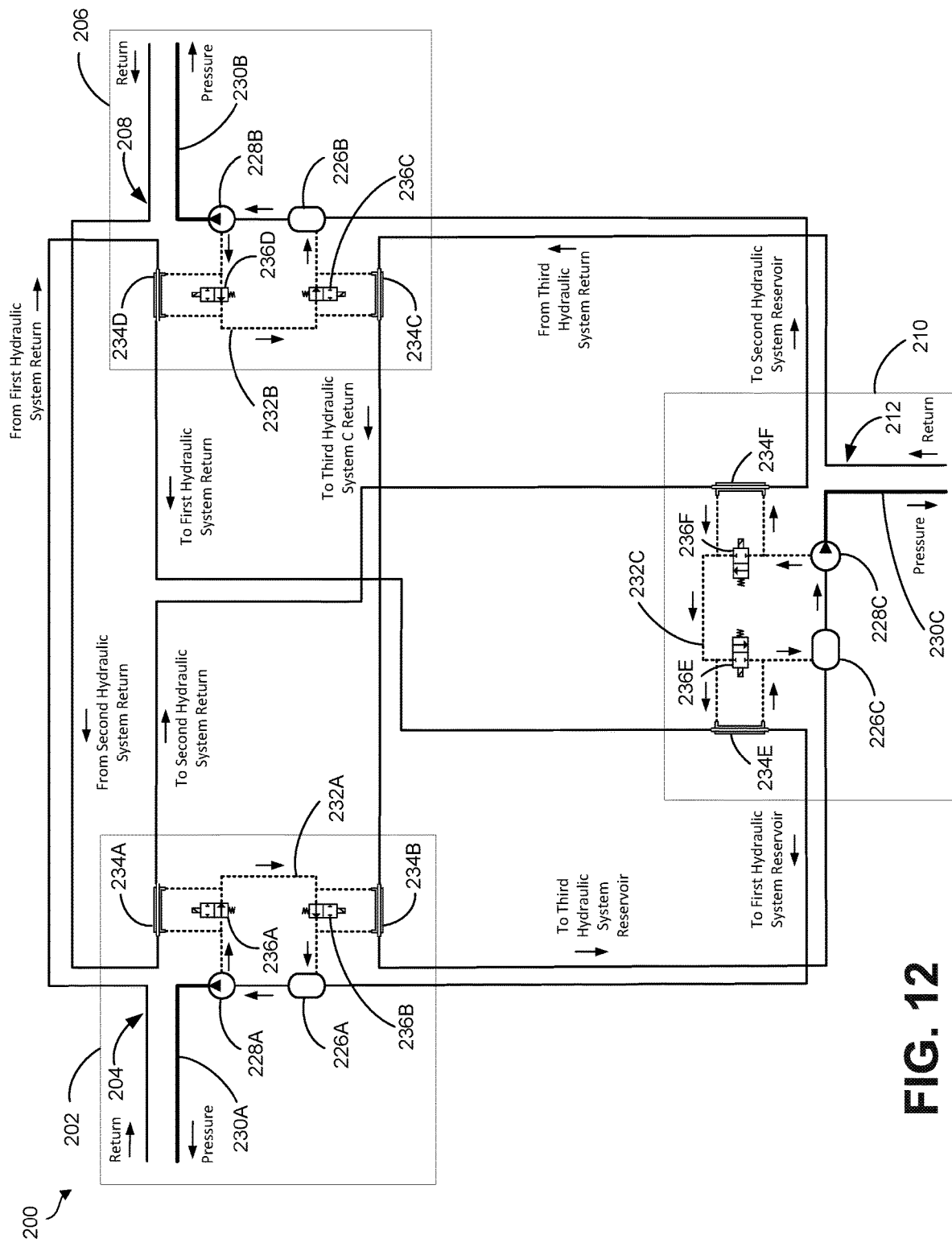
FIG. 12 is another configuration of the block diagram of the example aircraft thermal management system of FIG. 3, according to an example embodiment.

FIG. 12 illustrates the aircraft thermal management system 200 in which the fifth control valve 236E and the sixth control valve 236F are actuated, such that the fifth heat exchanger 234E is configured to exchange heat between the third hydraulic fluid 212 and the first hydraulic fluid 204 and the sixth heat exchanger 234F is configured to exchange heat between the third hydraulic fluid 212 and the second hydraulic fluid 208. Such an arrangement may occur when the controller 214 determines that the temperature of the third hydraulic fluid 212 is greater than a threshold temperature, and the controller 214 further determines that the temperature of the first hydraulic fluid 204 and the temperature of the second hydraulic fluid 208 are both less than the temperature of the third hydraulic fluid 212. Accordingly, such a configuration may be utilized to quickly cool down the third hydraulic fluid 212 to avoid overheating.

Figure 13:
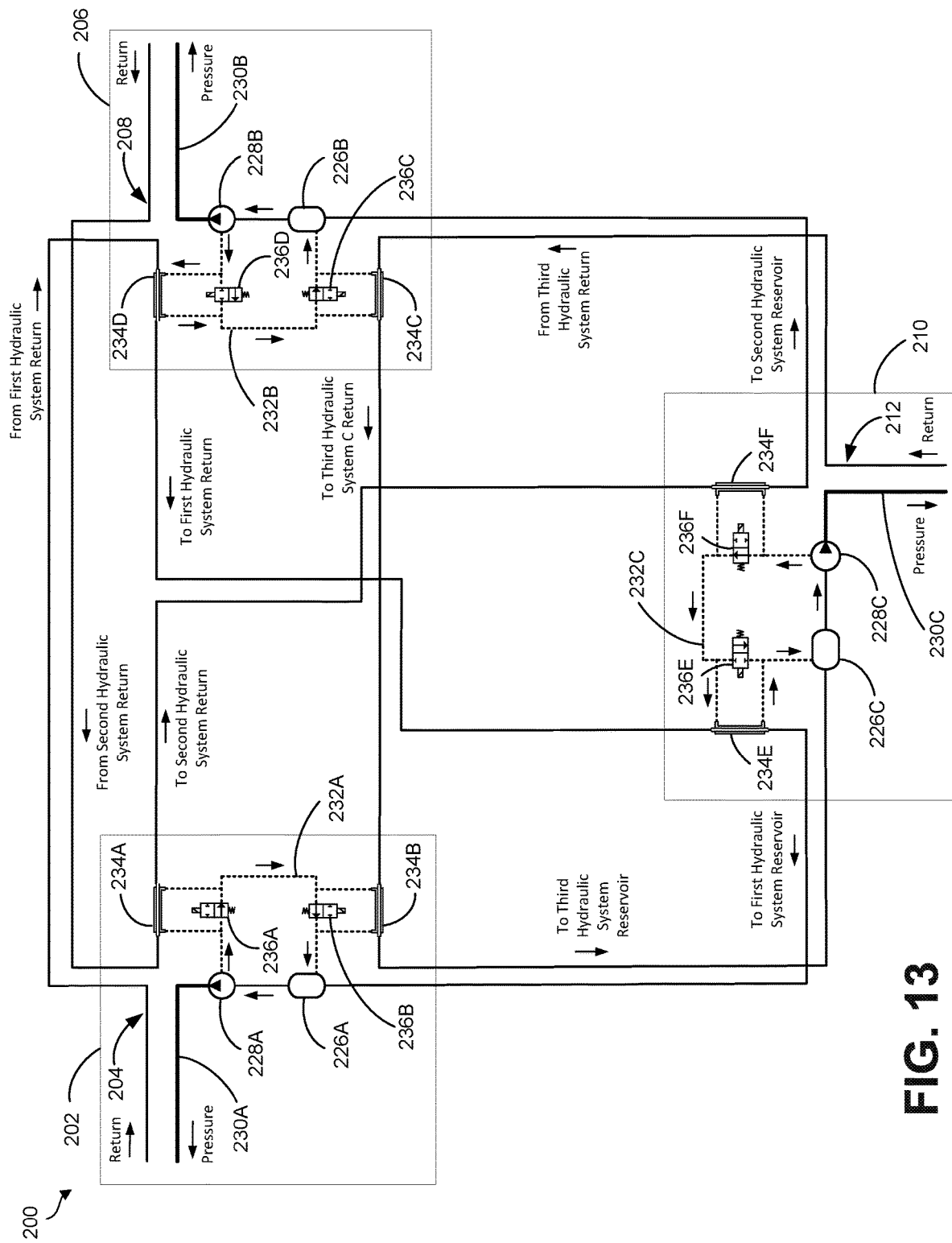
FIG. 13 is another configuration of the block diagram of the example aircraft thermal management system of FIG. 3, according to an example embodiment.

FIG. 13 illustrates the aircraft thermal management system 200 in which the fourth control valve 236D and the fifth control valve 236E are actuated, such that the fourth heat exchanger 234D is configured to exchange heat between the second hydraulic fluid 208 and the first hydraulic fluid 204 and the fifth heat exchanger 234E is configured to exchange heat between the third hydraulic fluid 212 and the first hydraulic fluid 204. Such an arrangement may occur when the controller 214 determines that the temperature of the first hydraulic fluid 204 is less than a threshold temperature, and the controller 214 further determines that the temperature of the second hydraulic fluid 208 and the temperature of the third hydraulic fluid 212 are both greater than the temperature of the first hydraulic fluid 204. Accordingly, such a configuration may be utilized to quickly warmup the first hydraulic fluid 204 in cold day operation.

Figure 14:
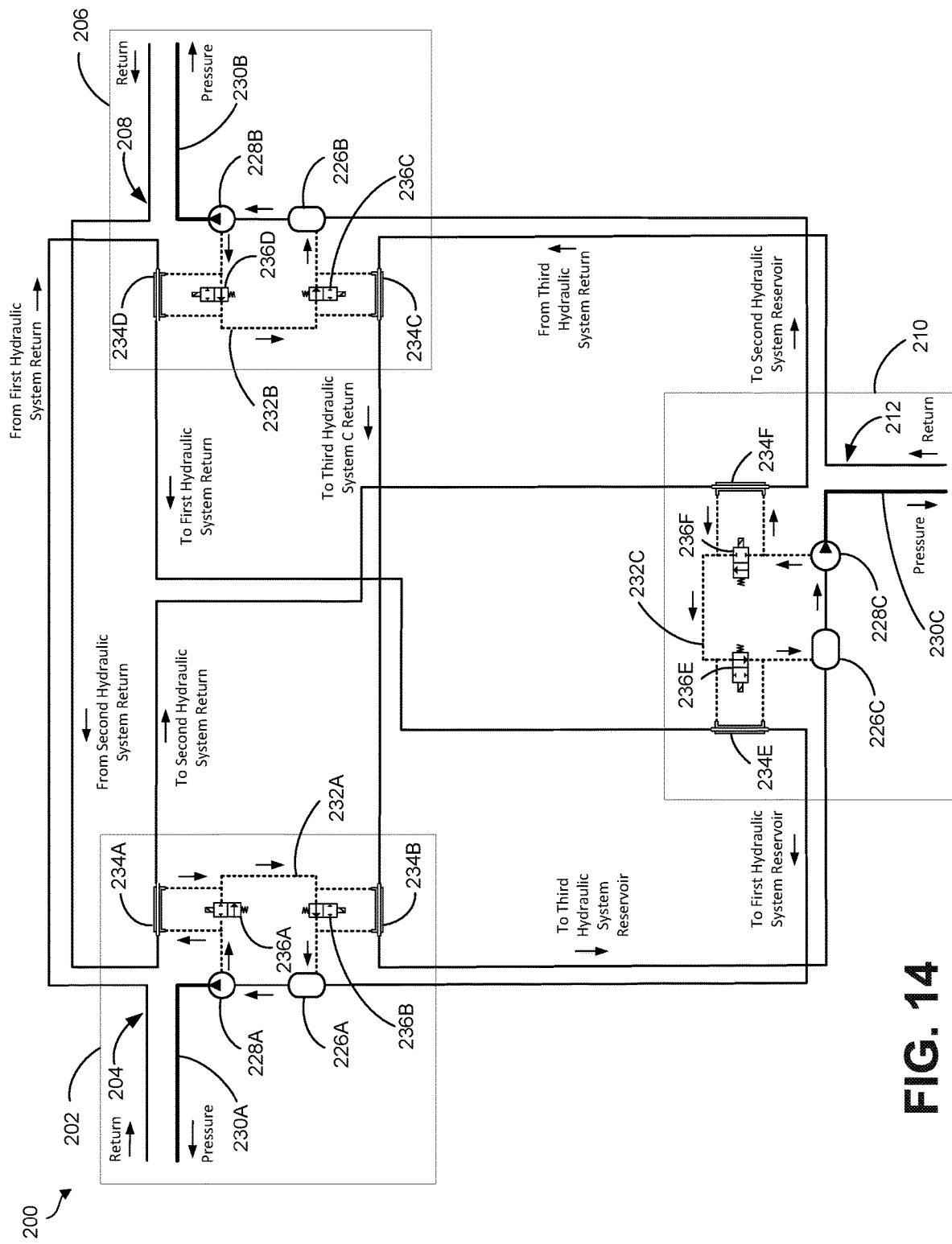
FIG. 14 is another configuration of the block diagram of the example aircraft thermal management system of FIG. 3, according to an example embodiment.

FIG. 14 illustrates the aircraft thermal management system 200 in which the first control valve 236A and the sixth control valve 236F are actuated, such that the first heat exchanger 234A is configured to exchange heat between the first hydraulic fluid 204 and the second hydraulic fluid 208 and the sixth heat exchanger 234F is configured to exchange heat between the third hydraulic fluid 212 and the second hydraulic fluid 208. Such an arrangement may occur when the controller 214 determines that the temperature of the second hydraulic fluid 208 is less than a threshold temperature, and the controller 214 further determines that the temperature of the first hydraulic fluid 204 and the temperature of the third hydraulic fluid 212 are both greater than the temperature of the second hydraulic fluid 208. Accordingly, such a configuration may be utilized to quickly warmup the second hydraulic fluid 208 in cold day operation.

Figure 15:
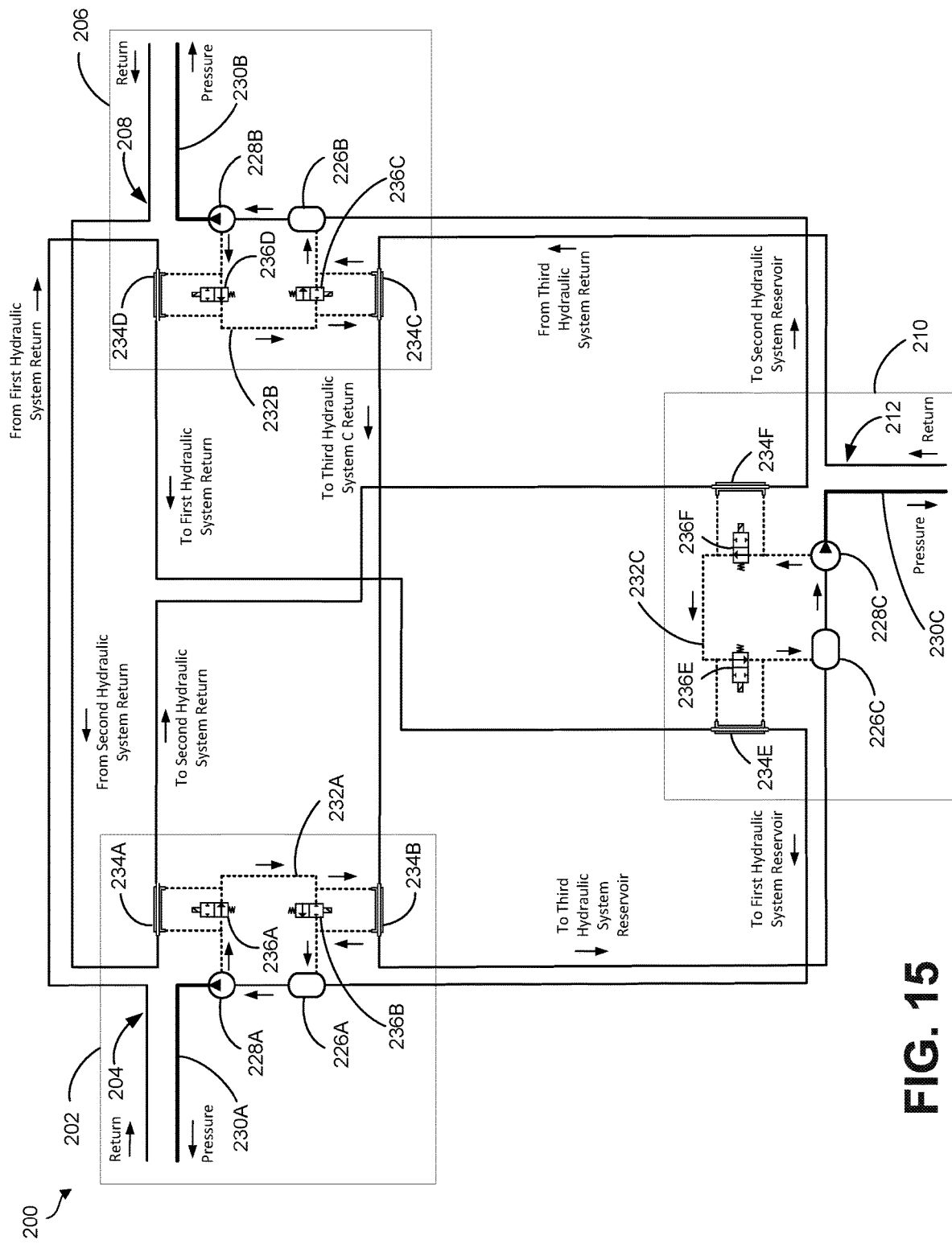
FIG. 15 is another configuration of the block diagram of the example aircraft thermal management system of FIG. 3, according to an example embodiment.

FIG. 15 illustrates the aircraft thermal management system 200 in which the second control valve 236B and the third control valve 236C are actuated, such that the second heat exchanger 234B is configured to exchange heat between the first hydraulic fluid 204 and the third hydraulic fluid 212 and the third heat exchanger 234C is configured to exchange heat between the second hydraulic fluid 208 and the third hydraulic fluid 212. Such an arrangement may occur when the controller 214 determines that the temperature of the third hydraulic fluid 212 is greater less a threshold temperature, and the controller 214 further determines that the temperature of the first hydraulic fluid 204 and the temperature of the second hydraulic fluid 208 are both greater than the temperature of the third hydraulic fluid 212. Accordingly, such a configuration may be utilized to quickly warmup the third hydraulic fluid 212 in cold day operation.

FIG. 16 is a block diagram of an example of a method 300 for managing temperatures in an aircraft. Method 300 shown in FIG. 16 presents an embodiment of a method that could be used with any of the aircraft thermal management systems described above in relation to FIGS. 1-15, as an example. Method 300 includes one or more operations, functions, or actions as illustrated by one or more of blocks 302-310. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, the method 300 can be caused to be performed by program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 16 may represent circuitry that is wired to perform the specific logical functions in the process.

Initially, at block 302, the method 300 includes circulating a first hydraulic fluid 204 through a first hydraulic system 202. The first hydraulic fluid 204 may be circulated through the first hydraulic system 202 via a first pump (such as first pump device 103 illustrated in FIG. 1).

At block 304, the method 300 includes circulating a second hydraulic fluid 208 through a second hydraulic system 206. The second hydraulic fluid 208 may be circulated through the second hydraulic system 206 via a second pump (such as second pump device 105 illustrated in FIG. 1).

At block 306, the method 300 includes circulating a third hydraulic fluid 212 through a third hydraulic system 210. The third hydraulic fluid 212 may be circulated through the third hydraulic system 210 via a third pump (such as third pump device 107 illustrated in FIG. 1).

At block 308, the method 300 includes determining a temperature of the first hydraulic fluid 204, a temperature of the second hydraulic fluid 208, and a temperature of the third hydraulic fluid 212. As discussed above, in one example the aircraft thermal management system 200 further incudes a first temperature sensor 224A positioned in or otherwise in communication the first hydraulic system 202 to measure a temperature of the first hydraulic fluid 204, a second temperature sensor 224B positioned in or otherwise in communication the second hydraulic system 206 to measure a temperature of the second hydraulic fluid 208, and a third temperature sensor 224C positioned in or otherwise in communication the third hydraulic system 210 to measure a temperature of the third hydraulic fluid 212.

At block 310, the method 300 includes, based on the determined temperature of the first hydraulic fluid 204, utilizing the second hydraulic fluid 208 and/or the third hydraulic fluid 212 to modify an operational temperature of the first hydraulic fluid 204.

In another example, the method 300 further includes comparing the determined temperature of the first hydraulic fluid 204 to a first threshold temperature and a second threshold temperature, where the second threshold temperature is greater than the first threshold temperature. Such a comparison may be made, for example, by the controller 214. In one such example, if the determined temperature of the first hydraulic fluid 204 is less than or equal to the first threshold temperature, the method 300 further includes providing the second hydraulic fluid 208 and the third hydraulic fluid 212 to the first hydraulic system 202 to thereby increase the operational temperature of the first hydraulic fluid 204. In another example, if the determined temperature of the first hydraulic fluid 204 is between the first threshold temperature and the second threshold temperature, the method 300 includes providing the second hydraulic fluid 208 or the third hydraulic fluid 212 to the first hydraulic system 202 to thereby increase the operational temperature of the first hydraulic fluid 204. In yet another example, if the determined temperature of the first hydraulic fluid 204 is greater than or equal to the second threshold temperature, the method 300 includes providing the first hydraulic fluid 204 to the second hydraulic system 206 and/or the third hydraulic system 210 to thereby decrease the operational temperature of the first hydraulic fluid 204.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may provide different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. An aircraft thermal management system comprising:
   a first hydraulic system for circulating a first hydraulic fluid;
   a second hydraulic system for circulating a second hydraulic fluid;
   a third hydraulic system for circulating a third hydraulic fluid; and
   a controller configured to:
      determine a temperature of the first hydraulic fluid, a temperature of the second hydraulic fluid, and a temperature of the third hydraulic fluid;
      compare the determined temperature of the first hydraulic fluid to a first threshold temperature and a second threshold temperature, wherein the second threshold temperature is greater than the first threshold temperature; and based on the determined temperature of the first hydraulic fluid being between the first threshold temperature and the second threshold temperature, provide the second hydraulic fluid or the third hydraulic fluid to the first hydraulic system to thereby increase an operational temperature of the first hydraulic fluid.

2. The aircraft thermal management system of claim 1, wherein the controller is further configured to:

provide the second hydraulic fluid and the third hydraulic fluid to the first hydraulic system to thereby increase the operational temperature of the first hydraulic fluid when the determined temperature of the first hydraulic fluid is less than or equal to the first threshold temperature.

3. The aircraft thermal management system of claim 1, wherein the controller is further configured to:

provide the first hydraulic fluid to the second hydraulic system and/or the third hydraulic system to thereby decrease the operational temperature of the first hydraulic fluid when the determined temperature of the first hydraulic fluid is greater than or equal to the second threshold temperature.

4. The aircraft thermal management system of claim 1, further comprising:

a first heat exchanger in fluid communication with the first hydraulic system and the second hydraulic system;

a second heat exchanger in fluid communication with the first hydraulic system and the third hydraulic system; and a third heat exchanger in fluid communication with the second hydraulic system and the third hydraulic system.

5. The aircraft thermal management system of claim 4, wherein each of the first heat exchanger, the second heat exchanger, and the third heat exchanger are located remote from a fuel tank.

6. The aircraft thermal management system of claim 4, wherein each of the first heat exchanger, the second heat exchanger, and the third heat exchanger comprises a tube-in-tube heat exchanger comprising:

a first tube; and a second tube, wherein the first tube circumscribes the second tube.

7. The aircraft thermal management system of claim 6, wherein the first tube of the first heat exchanger is in fluid communication with the first hydraulic system, wherein the second tube of the first heat exchanger is in fluid communication with the second hydraulic system, wherein the first tube of the second heat exchanger is in fluid communication with the first hydraulic system, wherein the second tube of the second heat exchanger is in fluid communication with the third hydraulic system, wherein the first tube of the third heat exchanger is in fluid communication with the second hydraulic system, and wherein the second tube of the third heat exchanger is in fluid communication with the third hydraulic system.

8. The aircraft thermal management system of claim 4, further comprising:

a first control valve in fluid communication with the first hydraulic system and the first heat exchanger, wherein the first heat exchanger is configured to exchange heat between the first hydraulic fluid and the second hydraulic fluid when the first control valve is actuated;

a second control valve coupled in fluid communication with the first hydraulic system and the second heat exchanger, wherein the second heat exchanger is configured to exchange heat between the first hydraulic fluid and the third hydraulic fluid when the second control valve is actuated; and a third control valve in fluid communication with the second hydraulic system and the third heat exchanger, wherein the third heat exchanger is configured to exchange heat between the second hydraulic fluid and the third hydraulic fluid when the third control valve is actuated.

9. The aircraft thermal management system of claim 8, wherein the first control valve is configured to transition from an open position to a closed position, wherein the first heat exchanger is configured to exchange heat between the first hydraulic fluid and the second hydraulic fluid when the first control valve is in the open position, wherein the second control valve is configured to transition from an open position to a closed position, wherein the second heat exchanger is configured to exchange heat between the first hydraulic fluid and the third hydraulic fluid when the second control valve is in the open position, wherein the third control valve is configured to transition from an open position to a closed position, wherein the third heat exchanger is configured to exchange heat between the second hydraulic fluid and the third hydraulic fluid when the third control valve is in the open position.

10. The aircraft thermal management system of claim 8, wherein each of the first control valve, the second control valve, and the third control valve comprises a solenoid valve.

11. The aircraft thermal management system of claim 8, further comprising:

a fourth heat exchanger in fluid communication with the first hydraulic fluid and the second hydraulic fluid;

a fourth control valve in fluid communication with the second hydraulic system and the fourth heat exchanger, wherein the fourth heat exchanger is configured to exchange heat between the second hydraulic fluid and the first hydraulic fluid when the fourth control valve is actuated;

a fifth heat exchanger in fluid communication with the first hydraulic fluid and the third hydraulic fluid;

a fifth control valve in fluid communication with the third hydraulic system and the fifth heat exchanger, wherein the fifth heat exchanger is configured to exchange heat between the third hydraulic fluid and the first hydraulic fluid when the fifth control valve is actuated;

a sixth heat exchanger in fluid communication with the second hydraulic fluid and the third hydraulic fluid; and a sixth control valve in fluid communication with the third hydraulic system and the sixth heat exchanger, wherein the sixth heat exchanger is configured to exchange heat between the third hydraulic fluid and the second hydraulic fluid when the sixth control valve is actuated.

12. A method for managing temperatures in an aircraft, the method comprising:

circulating a first hydraulic fluid through a first hydraulic system;

circulating a second hydraulic fluid through a second hydraulic system;

circulating a third hydraulic fluid through a third hydraulic system;

determining a temperature of the first hydraulic fluid, a temperature of the second hydraulic fluid, and a temperature of the third hydraulic fluid;

comparing the determined temperature of the first hydraulic fluid to a first threshold temperature and a second threshold temperature, wherein the second threshold temperature is greater than the first threshold temperature; and based on the determined temperature of the first hydraulic fluid being greater than or equal to the second threshold temperature, providing the first hydraulic fluid to the second hydraulic system and/or the third hydraulic system to thereby decrease an operational temperature of the first hydraulic fluid.

13. The method of claim 12, further comprising:
providing the second hydraulic fluid and the third hydraulic fluid to the first hydraulic system to thereby increase the operational temperature of the first hydraulic fluid when the determined temperature of the first hydraulic fluid is less than or equal to the first threshold temperature.

14. The method of claim 12, further comprising:
providing the second hydraulic fluid or the third hydraulic fluid to the first hydraulic system to thereby increase the operational temperature of the first hydraulic fluid when the determined temperature of the first hydraulic fluid is between the first threshold temperature and the second threshold temperature.

15. A controller for an aircraft thermal management system, comprising:
a processor; and
a non-transitory computer readable medium having stored therein instructions that are executable to cause the processor to perform functions, comprising:
circulating a first hydraulic fluid through a first hydraulic system;
circulating a second hydraulic fluid through a second hydraulic system;
circulating a third hydraulic fluid through a third hydraulic system;
determining a temperature of the first hydraulic fluid, a temperature of the second hydraulic fluid, and a temperature of the third hydraulic fluid;
comparing the determined temperature of the first hydraulic fluid to a first threshold temperature and a second threshold temperature, wherein the second threshold temperature is greater than the first threshold temperature; and
based on the determined temperature of the first hydraulic fluid being greater than or equal to the second threshold temperature, providing the first hydraulic fluid to the second hydraulic system and/or the third hydraulic system to thereby decrease an operational temperature of the first hydraulic fluid.

16. The controller of claim 15, wherein the functions further comprise:
providing the second hydraulic fluid and the third hydraulic fluid to the first hydraulic system to thereby increase the operational temperature of the first hydraulic fluid when the determined temperature of the first hydraulic fluid is less than or equal to the first threshold temperature;
providing the second hydraulic fluid or the third hydraulic fluid to the first hydraulic system to thereby increase the operational temperature of the first hydraulic fluid when the determined temperature of the first hydraulic fluid is between the first threshold temperature and the second threshold temperature.

17. The method of claim 12, wherein a first heat exchanger is in fluid communication with the first hydraulic system and the second hydraulic system, and the method further comprises:
exchanging heat between the first hydraulic fluid and the second hydraulic fluid based on actuation of a first control valve in fluid communication with the first hydraulic system and the first heat exchanger.

18. The method of claim 17, wherein a second heat exchanger is in fluid communication with the first hydraulic system and the third hydraulic system, and the method further comprises
exchanging heat between the first hydraulic fluid and the third hydraulic fluid based on actuation of a second control valve in fluid communication with the first hydraulic system and the second heat exchanger.

19. The method of claim 18, wherein a third heat exchanger is in fluid communication with the second hydraulic system and the third hydraulic system, and the method further comprises
exchanging heat between the second hydraulic fluid and the third hydraulic fluid based on actuation of a third control valve in fluid communication with the second hydraulic system and the third heat exchanger.

20. The method of claim 19, wherein a fourth heat exchanger is in fluid communication with the first hydraulic fluid and the second hydraulic fluid, and the method further comprises:
exchanging heat between the second hydraulic fluid and the first hydraulic fluid based on actuation of a fourth control valve in fluid communication with the second hydraulic system and the fourth heat exchanger.

* * * * *